US012629854B2

(12) United States Patent
Kearney et al.

(10) Patent No.: US 12,629,854 B2
(45) Date of Patent: May 19, 2026

(54) HAIR REMOVAL DEVICE

(71) Applicant: The Gillette Company LLC, Boston, MA (US)

(72) Inventors: Robert Andrew Kearney, Reading (GB); Hannah Bryony Roberts, Ferndown (GB)

(73) Assignee: The Gillette Company LLC, Boston, MA (US)

( * ) Notice: Subject to any disclaimer, the term of this patent is extended or adjusted under 35 U.S.C. 154(b) by 180 days.

(21) Appl. No.: 18/406,803

(22) Filed: Jan. 8, 2024

(65) Prior Publication Data

US 2024/0227224 A1 Jul. 11, 2024

Related U.S. Application Data

(60) Provisional application No. 63/437,879, filed on Jan. 9, 2023.

(51) Int. Cl.
B26B 21/40 (2006.01)
B26B 21/52 (2006.01)
F16F 1/32 (2006.01)

(52) U.S. Cl.
CPC ........ B26B 21/4043 (2013.01); B26B 21/521 (2013.01); B26B 21/523 (2013.01); F16F 1/328 (2013.01)

(58) Field of Classification Search
None
See application file for complete search history.

(56) References Cited

U.S. PATENT DOCUMENTS

| | | | |
|---|---|---|---|
| 2,989,804 | A | 6/1961 | Yellon |
| 4,712,300 | A | 12/1987 | Hemmeter |

(Continued)

FOREIGN PATENT DOCUMENTS

EP 0276066 A1 7/1988

OTHER PUBLICATIONS

PCT Search Report and Written Opinion for PCT/US2024/010779 dated Mar. 26, 2024, 14 pages.

(Continued)

*Primary Examiner* — Hwei-Siu C Payer
(74) *Attorney, Agent, or Firm* — Andres E. Velarde

(57) ABSTRACT

A hair removal device is provided including a hair removal surface having a first perimeter and a multi-angle deflector having a second perimeter greater than or equal to the first perimeter wherein the multi-angle deflector is coupled to the hair removal surface. The device includes an applicator head having a third perimeter greater than or equal to the first perimeter, wherein the hair removal surface is coupled to the multi-angle deflector via the applicator head. The device includes a base, having a fourth perimeter coupled to the multi-angle deflector, wherein the third perimeter is greater than or equal to the fourth perimeter. A base-deflector connection portion is coupled to a deflector-base connection portion, an applicator-deflector connection portion is coupled to a deflector-applicator connection portion, the multi-angle deflector provides multidirectional deflection connection of the applicator head relative to the base, and the fourth perimeter encircles the base-deflector connection portion.

17 Claims, 27 Drawing Sheets

(56)                References Cited

U.S. PATENT DOCUMENTS

| | | | |
|---|---|---|---|
| 4,720,917 A | 1/1988 | Solow | |
| 4,807,360 A | 2/1989 | Cerier et al. | |
| 4,875,288 A | 10/1989 | Trotta et al. | |
| 4,893,641 A | 1/1990 | Strickland | |
| 4,964,214 A | 10/1990 | Welsh et al. | |
| 4,977,670 A | 12/1990 | Iten | |
| 5,031,318 A | 7/1991 | Brown et al. | |
| 5,604,983 A | 2/1997 | Simms et al. | |
| 5,802,720 A | 9/1998 | Pribe | |
| 6,032,365 A | 3/2000 | Hodges | |
| 7,162,800 B2 | 1/2007 | Orloff et al. | |
| 7,197,825 B2 | 4/2007 | Walker et al. | |
| 7,695,207 B1 | 4/2010 | Laghi | |
| 7,730,619 B2 | 6/2010 | Ozenick | |
| 8,677,628 B2 | 3/2014 | Harris, II | |
| 9,227,331 B2 | 1/2016 | Zhuk et al. | |
| 10,814,508 B1 | 10/2020 | Gilman | |
| 11,052,268 B2 * | 7/2021 | Mittelstadt | A62B 18/10 |
| 11,446,836 B2 | 9/2022 | Harris, II | |
| 11,524,420 B2 | 12/2022 | Haley | |
| D1,084,512 S | 7/2025 | Kearney | |
| 12,370,708 B2 | 7/2025 | Kearney et al. | |
| 2004/0020053 A1 | 2/2004 | Wain | |
| 2004/0168323 A1 | 9/2004 | Lembke | |
| 2010/0205808 A1 | 8/2010 | King | |
| 2010/0242201 A1 | 9/2010 | Linzell | |
| 2012/0291289 A1 | 11/2012 | Glezerman | |
| 2016/0121495 A1 | 5/2016 | Johnson | |
| 2020/0130206 A1 | 4/2020 | Niles | |
| 2022/0330985 A1 | 10/2022 | Kearney et al. | |
| 2022/0381311 A1 * | 12/2022 | Jeng | F16F 1/373 |
| 2023/0240436 A1 | 8/2023 | Gross et al. | |
| 2024/0227222 A1 * | 7/2024 | Kearney | B26B 21/56 |

OTHER PUBLICATIONS

Unpublished U.S. Appl. No. 18/406,860, filed Jan. 8, 2024, to Robert Andrew Kearney et. al.

* cited by examiner

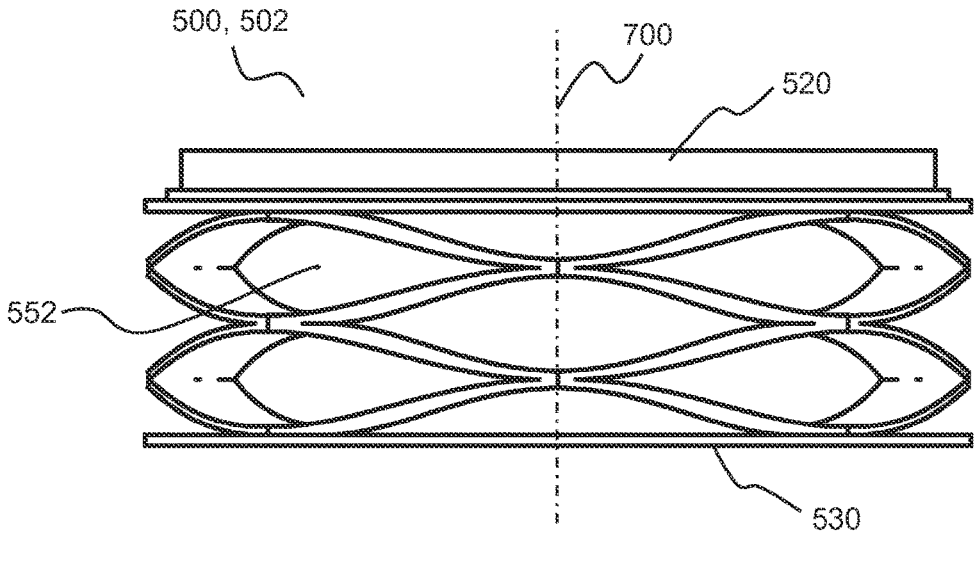
FIG. 20
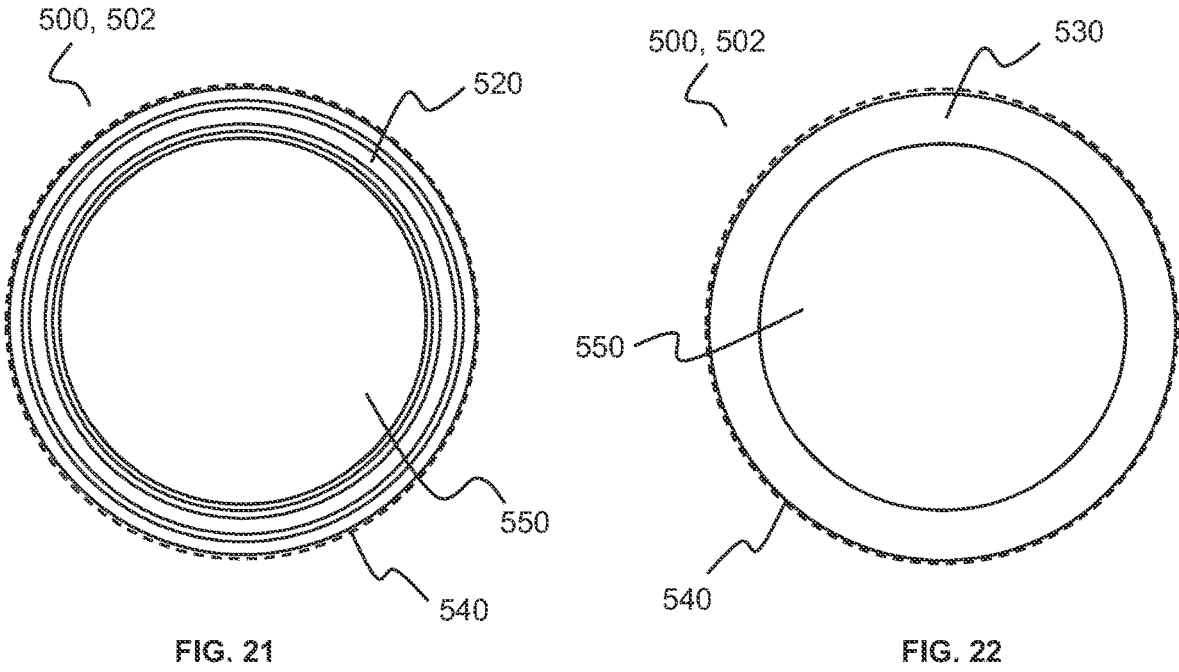
FIG. 21          FIG. 22

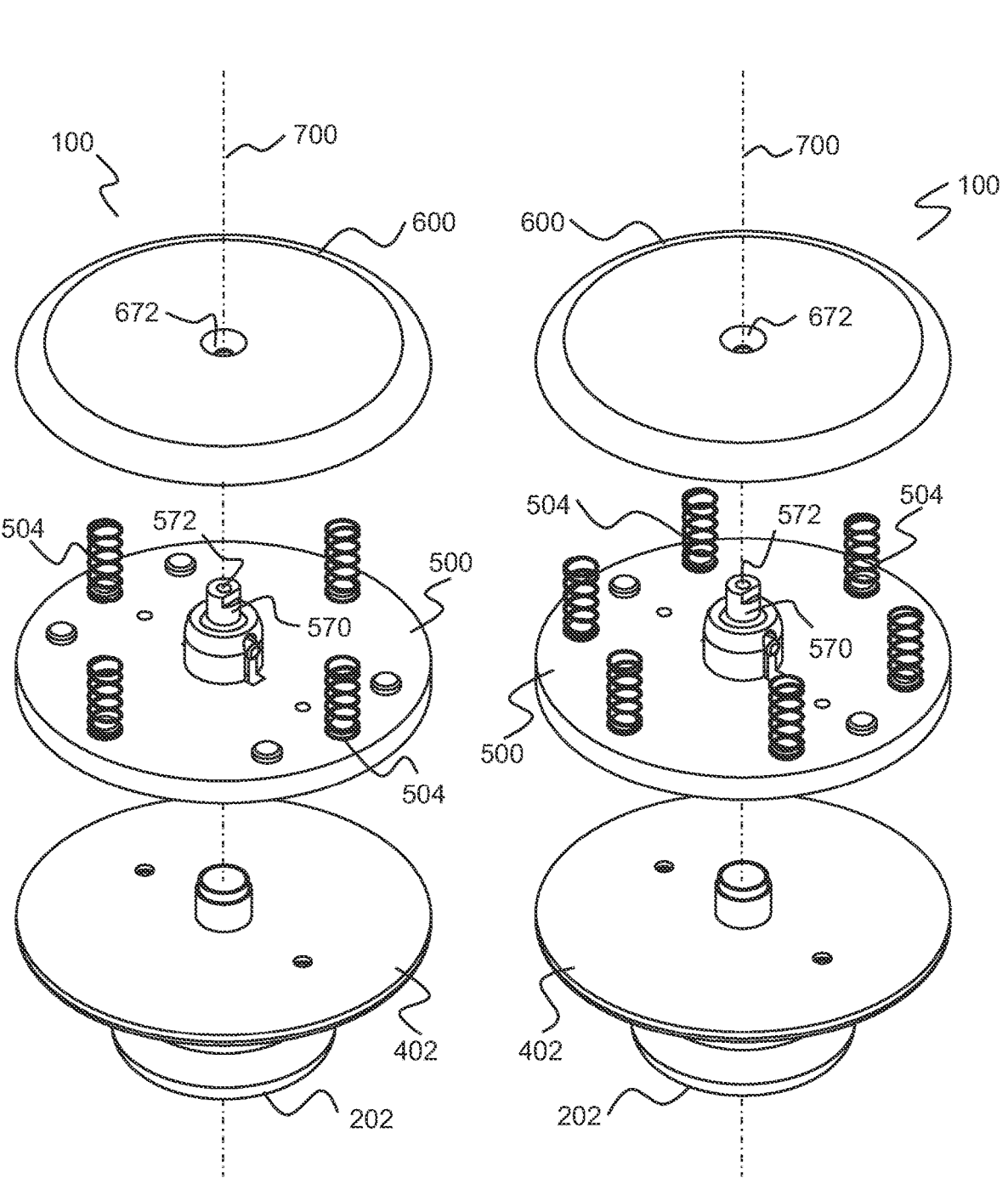
FIG. 42                                    FIG. 43

HAIR REMOVAL DEVICE

FIELD OF THE INVENTION

The present disclosure relates generally to devices for hair removal and more specifically to devices for back hair removal.

BACKGROUND OF THE INVENTION

The discussion of shortcomings and needs existing in the field prior to the present disclosure is in no way an admission that such shortcomings and needs were recognized by those skilled in the art prior to the present disclosure.

Hairs on the body grow in many directions, with hairs located next to each other or in close proximity to one another, often growing in very different directions. Today's wet shave razors require the hairs to be approached by the blade in a particular direction to ensure that they are cut effectively. Hairs which are cut by a blade travelling in a direction opposite to the direction of growth, often termed up-strokes, are cut closer and more consistently than hairs which are cut by a blade travelling perpendicular to the direction of hair growth. To compensate for this shortcoming, it is necessary for the user to take lots of strokes in multiple directions to ensure that all of the hairs are removed effectively. A further shortcoming of today's wet shave razors is that they must only be used to perform strokes which are perpendicular with the direction of the blade edge to ensure that there is no slicing motion of the blade relative to the skin, since this can result in nicks and cuts. When shaving areas of the body which are difficult to reach, such as the back, it can be particularly difficult to ensure that there is no lateral movement of the blade relative to the skin. This results in the user having to expend significant amounts of energy to try to maintain linear strokes or having to ask a third party to help them to remove the hair or for the user to compromise on the safety of their shave.

Blades guarded by combs would likely reduce the risk of nicks and cuts resulting from any slicing motion of the blade but have the undesirable effect of limiting how close to the skin the hair can be cut.

Electric dry foil shavers have the advantage that they can be used safely in any direction over the skin and their hair removal efficiency is less affected by the direction of movement relative to the hairs, however, they do not cut hairs as close to the skin as wet shave razors.

Hair removal surfaces, such as foils, in combination with pivots typically seen in hair removal devices, are generally rigid and inflexible, only allowing movement in one direction, encouraging the user to take linear strokes in-use, and this limitation forces users to expend energy and compensate for poor ergonomics in how they hold and angle the product. As such, even if improved cutting edges are implemented in the product, the product does not allow users to fully benefit.

To ensure effective and efficient hair removal, it is vital that a hair removal surface remains in good contact with the skin. This is easily achieved over large, flat surfaces but is more difficult when removing hair from heavily contoured parts of the body, such as the back, knees, underarms, or shoulders. Many hair removal devices attempt to improve the contact between the hair removal surface and the skin by allowing the hair removal surface to pivot. However, the pivots in current hair removal products are limited to deflection around one or two axes, which limits the ability of the hair removal surface to reorientate itself to improve contact with the skin.

Hair removal surfaces that are used to shave in multiple directions are subjected to forces in multiple directions, which can cause the hair removal surface to tip away from the skin if the edge of the hair removal surface or applicator catches on or snags the skin, for example due to areas of high friction, or on extreme contours of the body, for example the shoulder blades. If this occurs and the hair removal surface/applicator is flipped or tipped it can lead to undesirable effects such as the underside edge of the applicator scratching the skin and reducing hair removal efficiency due to the hair removal surface no longer being in contact with the skin.

Therefore, a need has been identified for a hair removal device to encourage unrestricted multi-directional use.

SUMMARY OF THE INVENTION

Various examples disclosed herein solve the above-mentioned problems by providing devices capable of multi-directional deflection of a hair removal surface to facilitate unrestricted multi-directional use, particularly when shaving back or body hair.

The present invention is directed to a hair removal device including a hair removal surface, having a first perimeter, and a multi-angle deflector having a second perimeter that is greater than or equal to the first perimeter, wherein the multi-angle deflector is coupled to the hair removal surface.

In one embodiment, the hair removal device further includes an applicator head having a third perimeter that is greater than or equal to the first perimeter, wherein the hair removal surface is coupled to the multi-angle deflector via the applicator head.

In another embodiment, the hair removal device further includes a base, having a fourth perimeter coupled to the multi-angle deflector, wherein the third perimeter is greater than or equal to the fourth perimeter.

According to one example, a base-deflector connection portion of the base is coupled to a deflector-base connection portion of the multi-angle deflector, wherein an applicator-deflector connection portion of the applicator head is coupled to a deflector-applicator connection portion of the multi-angle deflector, and wherein the multi-angle deflector is adapted to provide a multidirectional deflection connection of the applicator head relative to the base, and wherein the fourth perimeter encircles the base-deflector connection portion of the base.

According to another example, the multi-angle deflector comprises a spring, a deformable substrate, or both. The deformable substrate includes a sponge, an elastomeric web, or both. The deformable substrate has a deflection stiffness ranging from 0.05 N/mm and 5 N/mm. The multi-angle deflector comprises a wave spring.

Still further, the multi-angle deflector comprises a thickness of about 1 mm to about 100 mm. The multi-angle deflector provides a multidirectional deflection connection of the applicator head relative to the base, which can be a multidirectional pivoting movement in at least three dimensions.

According to various examples, the multi-angle deflector has a thickness greater than a thickness of the base or a thickness of the applicator head, and may comprise a central aperture, and wherein the base comprises a central aperture aligned with the central aperture of the multi-angle deflector.

Still further, the multi-angle deflector comprises a plurality of rinsing windows through which debris and/or cut hairs may be removed.

The hair removal surface provides removal of hair, oil, debris, or dead skin cells and removes back hair. The applicator head supports and/or surrounds the hair removal surface. The hair removal surface has at least one treatment sheet, the sheet comprising non-linear cutting edges or a plurality of apertures which prevent slice cuts.

According to some examples, the hair removal device includes a proximal portion, a distal portion, and a medial portion disposed therebetween, wherein the distal portion comprises the base, wherein the medial portion comprises at least one telescoping segment, wherein the proximal portion comprises a handle. The medial portion is extendable, retractable, foldable, or compressible. The proximal portion and the medial portion extend along a first longitudinal axis, wherein the base, the multi-angle deflector, and the applicator head extend along an alignment axis, wherein at least a portion of the base also extends along a second longitudinal axis that is orthogonal to the alignment axis, and wherein the first longitudinal axis is disposed at an angle relative to the second longitudinal axis. The angle is from 5 to 60 degrees. The portion of the base extending along the second longitudinal axis is parallel to the hair removal surface.

In a still further example, the base is separable from the medial portion to provide a discrete hand-held unit. The base may include apertures to accept a hand strap to provide a discrete hand-held unit.

According to various examples, a hair removal device may comprise a base, a multi-angle deflector coupled to the base, an applicator head coupled to the multi-angle deflector, and a hair removal surface coupled to the applicator head. The hair removal surface may comprise a plurality of enclosed, non-linear cutting edges. The multi-angle deflector may be adapted to provide a multidirectional deflection connection of the applicator head and the hair removal surface relative to the base.

These and other features, aspects, and advantages of various embodiments will become better understood with reference to the following description, figures, and claims.

BRIEF DESCRIPTION OF THE DRAWINGS

Many aspects of this disclosure can be better understood with reference to the following figures.

FIG. 20 is an example illustrating a schematic side view of a multi-angle deflector in the form of a wave spring.

FIG. 21 is an example illustrating a schematic top view of a multi-angle deflector in the form of a wave spring.

FIG. 22 is an example illustrating a schematic bottom view of a multi-angle deflector in the form of a wave spring.

5 6

Figures 36, 37, 38:
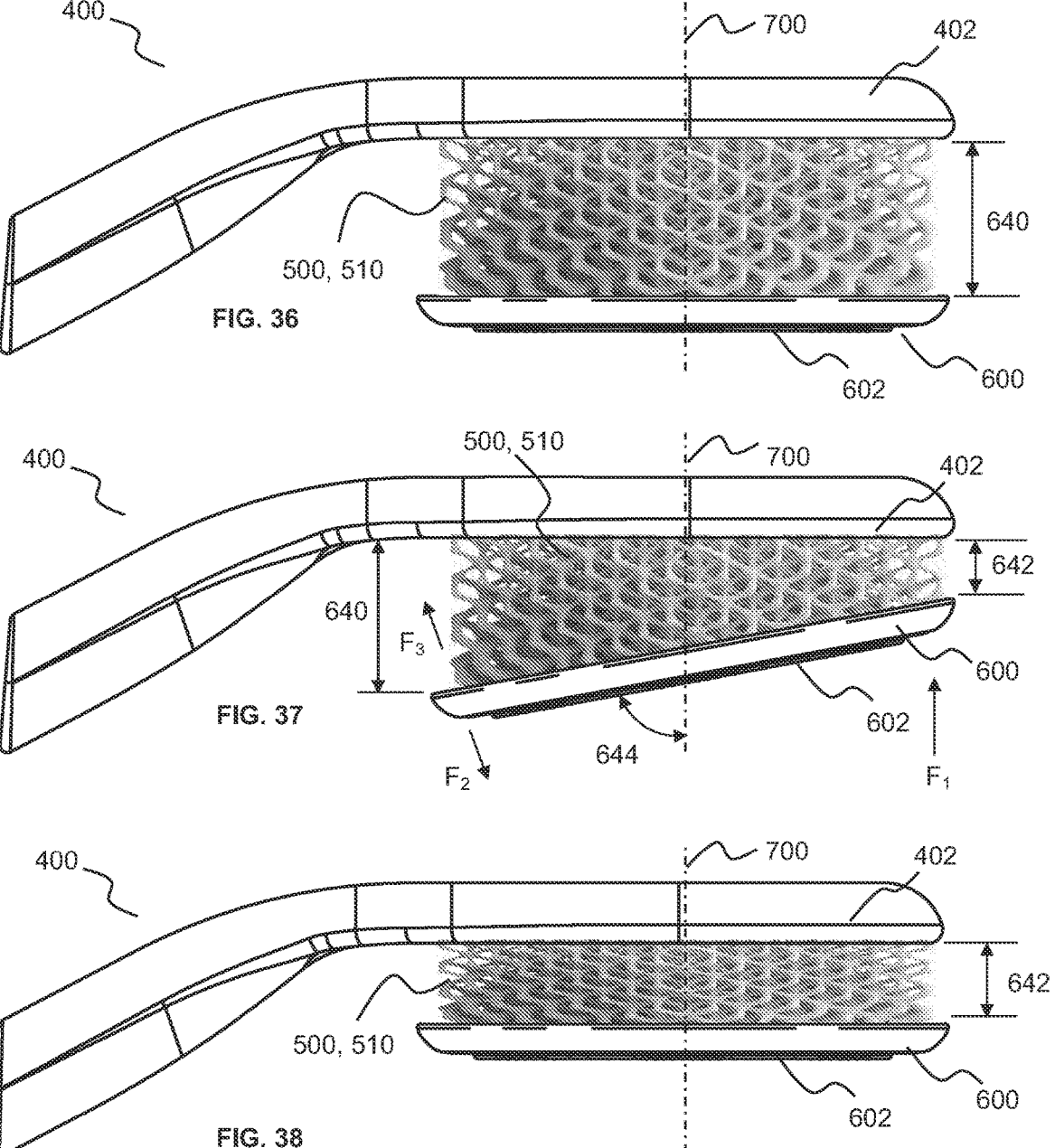
FIG. 36 is an example illustrating a schematic side view of a distal portion of a hair removal device in an uncompressed state.

FIG. 37 is an example illustrating a schematic side view of a distal portion of a hair removal device compressed at an angle relative to an alignment axis.

FIG. 38 is an example illustrating a schematic side view of a distal portion of a hair removal device compressed along an alignment axis.

Figures 39, 40, 41:
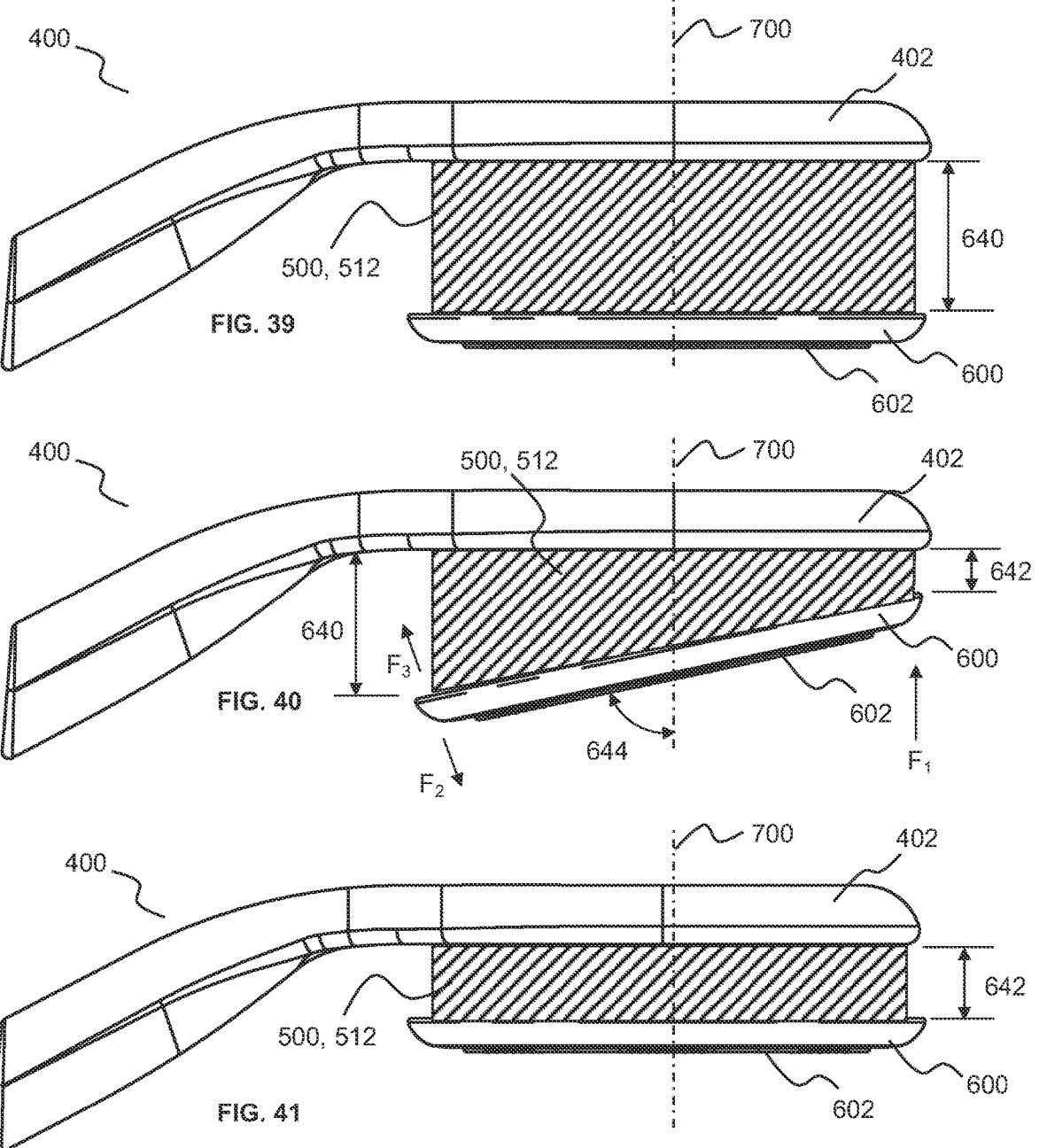

FIG. 39 is an example illustrating a schematic side view of a distal portion of a hair removal device in an uncompressed state.

FIG. 40 is an example illustrating a schematic side view of a distal portion of a hair removal device compressed at an angle relative to an alignment axis.

FIG. 41 is an example illustrating a schematic side view of a distal portion of a hair removal device compressed along an alignment axis.

FIG. 42 is an example illustrating a schematic bottom perspective view of a hair removal device comprising a multi-angle deflector having a plurality of springs.

FIG. 43 is an example illustrating a schematic bottom perspective view of a hair removal device comprising a multi-angle deflector having a plurality of springs.

Figures 44, 45, 46:
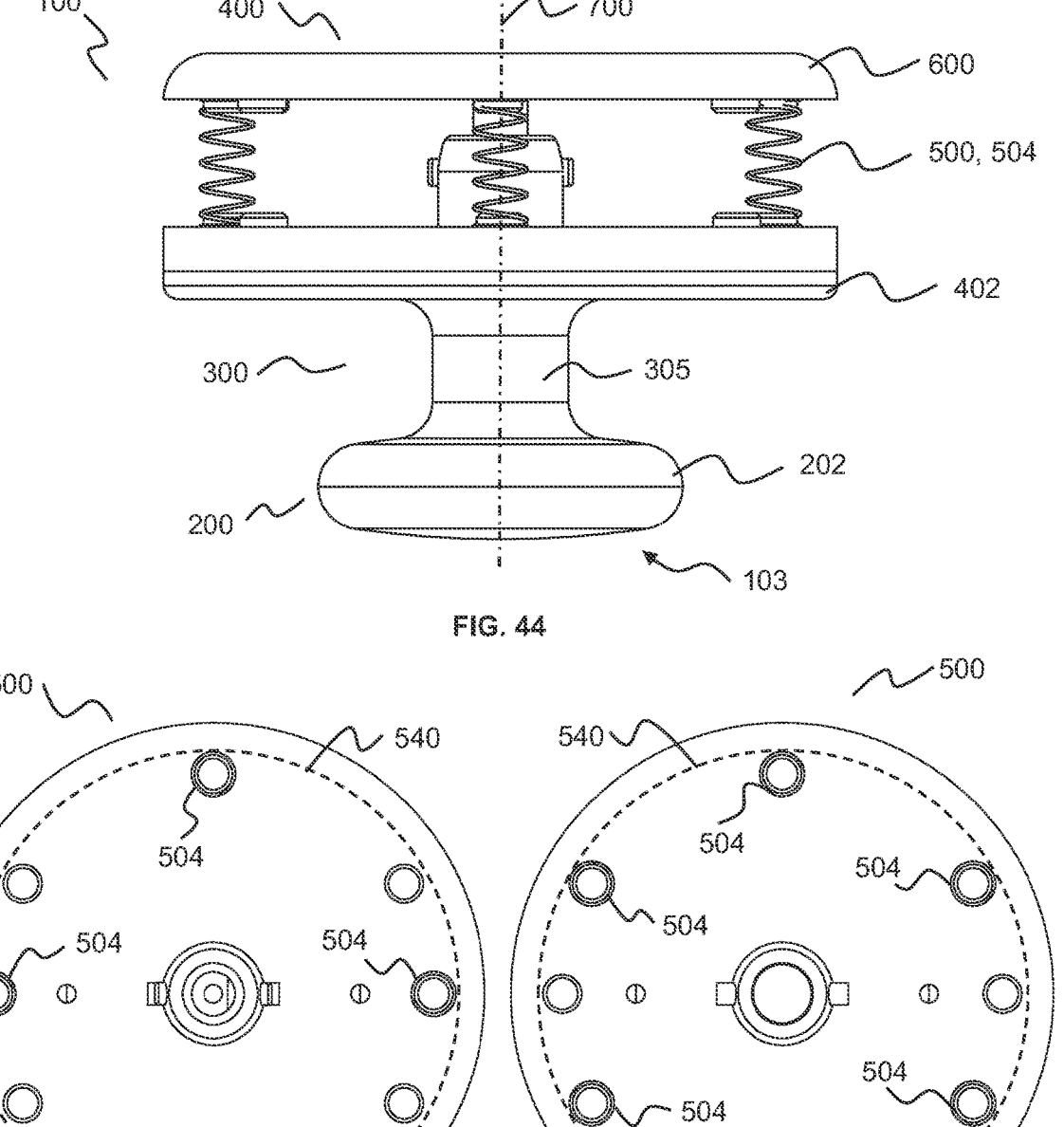

FIG. 44 is an example illustrating a schematic side view of a hair removal device comprising a multi-angle deflector having a plurality of springs.

FIG. 45 is an example illustrating a schematic bottom view of a multi-angle deflector having a plurality of springs.

FIG. 46 is an example illustrating a schematic bottom view of a multi-angle deflector having a plurality of springs.

Figure 47:
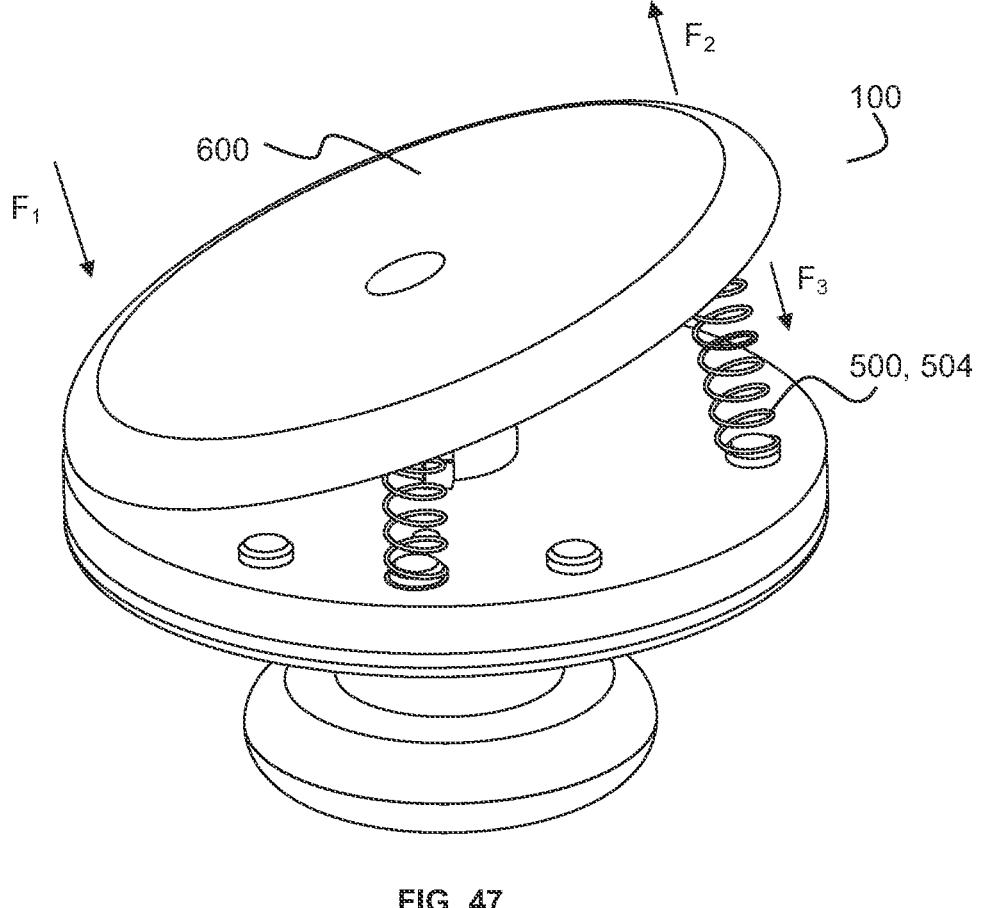

FIG. 47 is an example illustrating a schematic perspective view of a hair removal device comprising a multi-angle deflector comprising plurality of springs, showing the applicator head in a deflected state.

Figure 48:
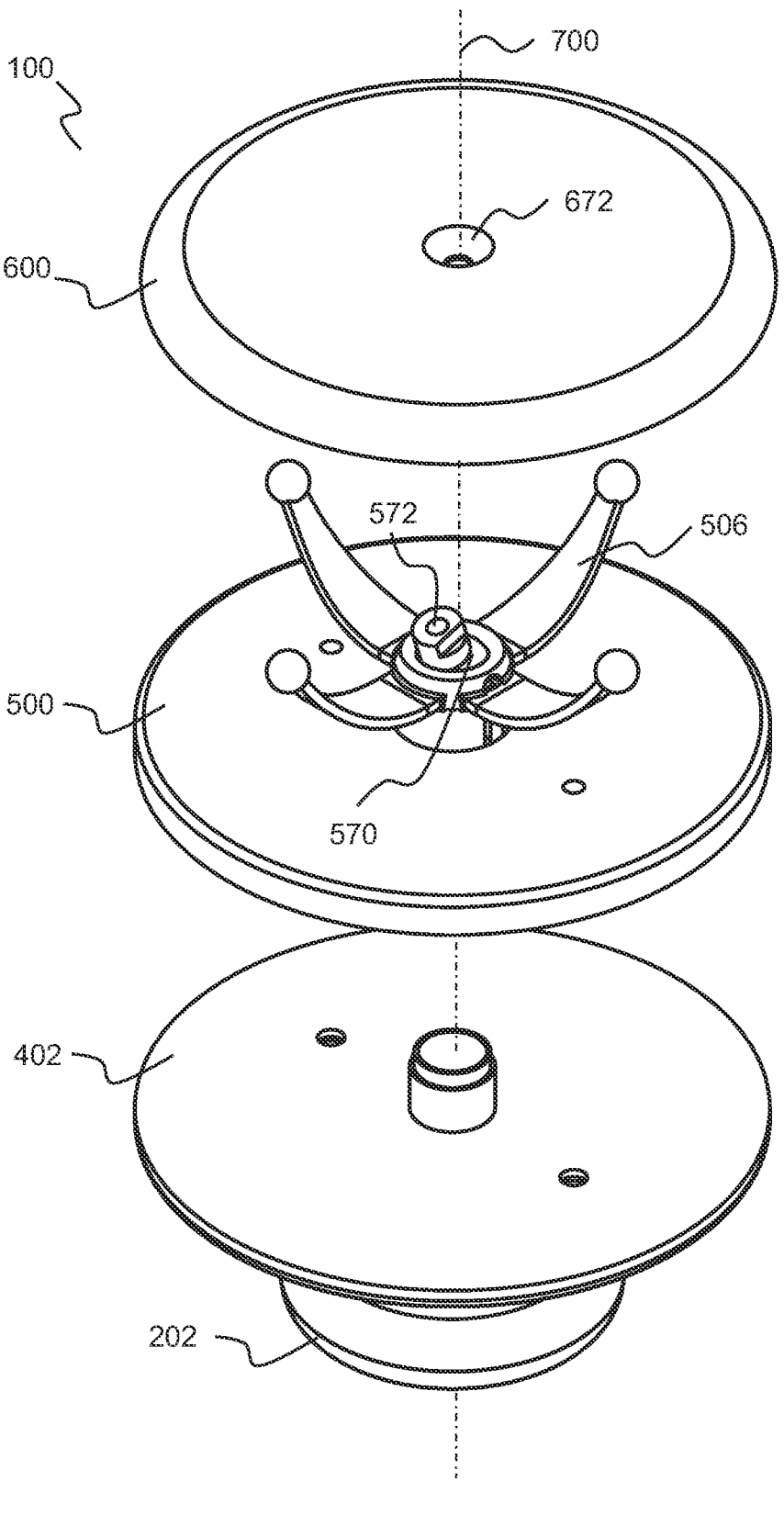

FIG. 48 is an example illustrating a schematic bottom perspective view of a hair removal device comprising a multi-angle deflector having a plurality of deflection arms.

Figure 49:
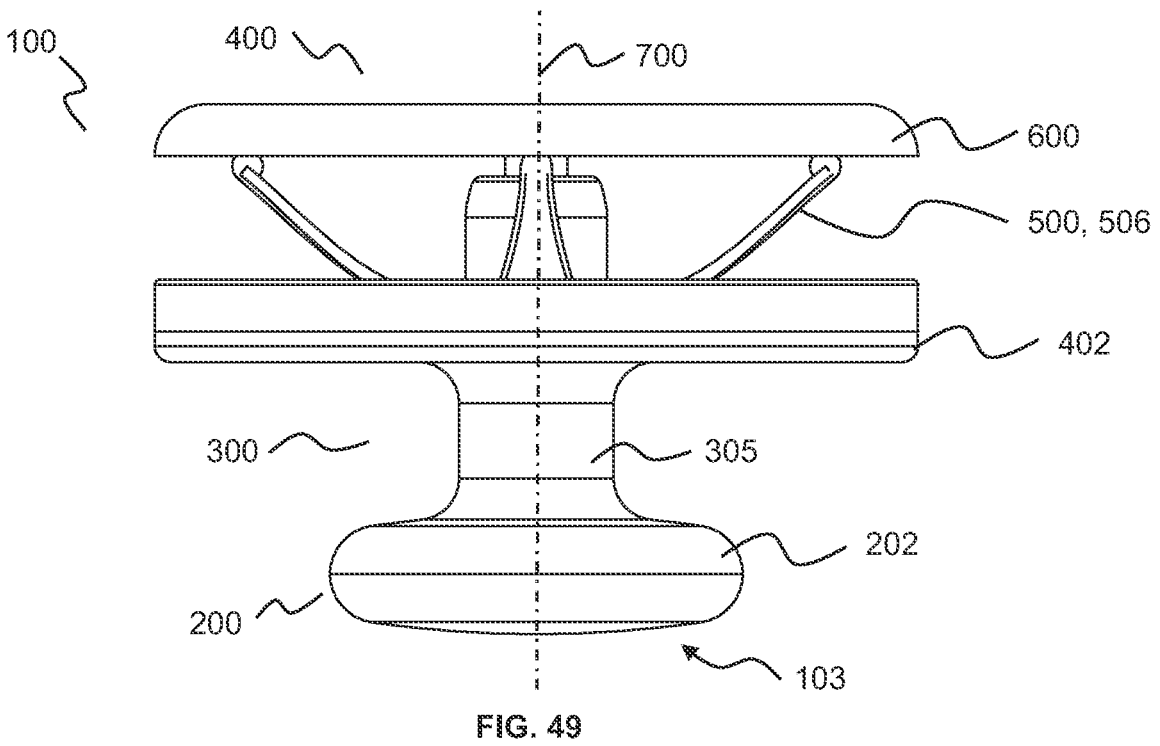

FIG. 49 is an example illustrating a schematic side view of a hair removal device comprising a multi-angle deflector having a plurality of deflection arms.

Figure 50:
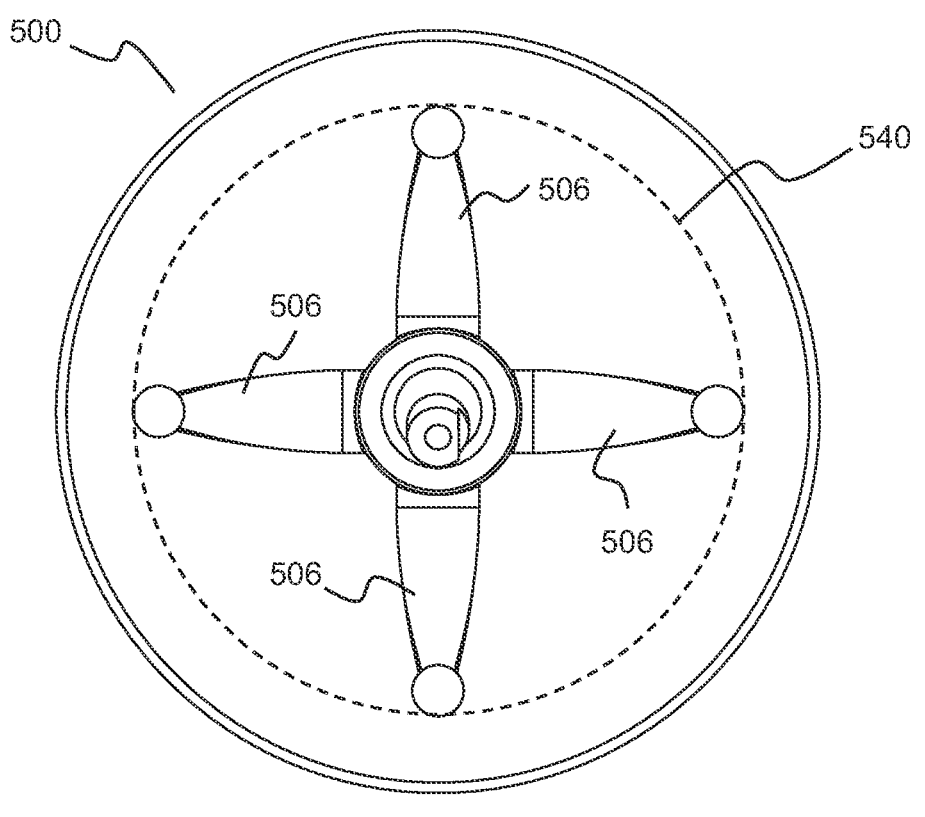

FIG. 50 is an example illustrating a schematic bottom view of a multi-angle deflector having a plurality of deflection arms.

Figures 51, 52:
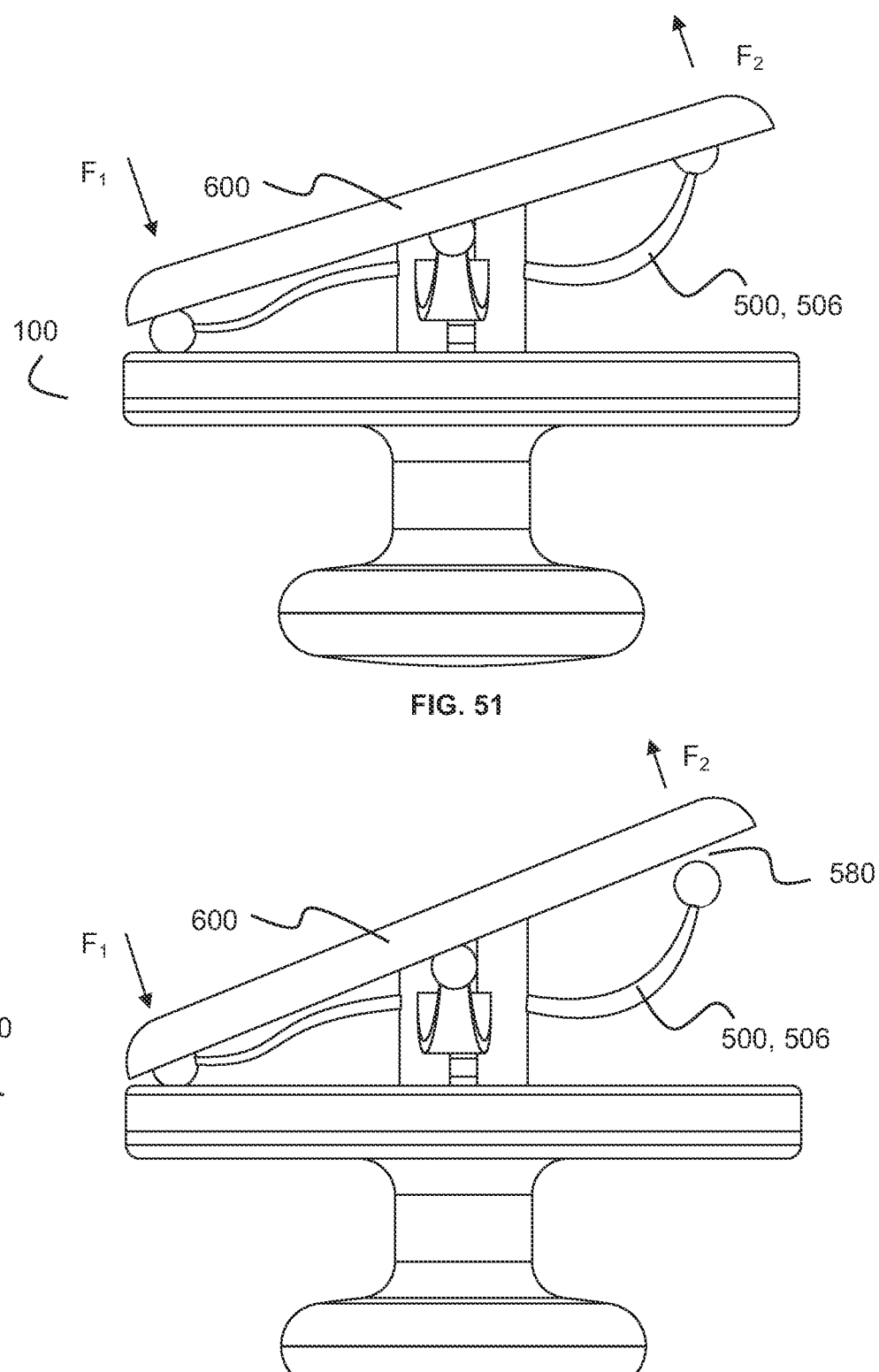

FIG. 51 is an example illustrating a schematic side view of a hair removal device comprising a multi-angle deflector comprising a plurality of deflection arms, showing the applicator head in a deflected state.

FIG. 52 is an example illustrating a schematic side view of a hair removal device comprising a multi-angle deflector comprising a plurality of deflection arms, showing the applicator head in a deflected state during an uncontrolled seesawing.

Figure 53:
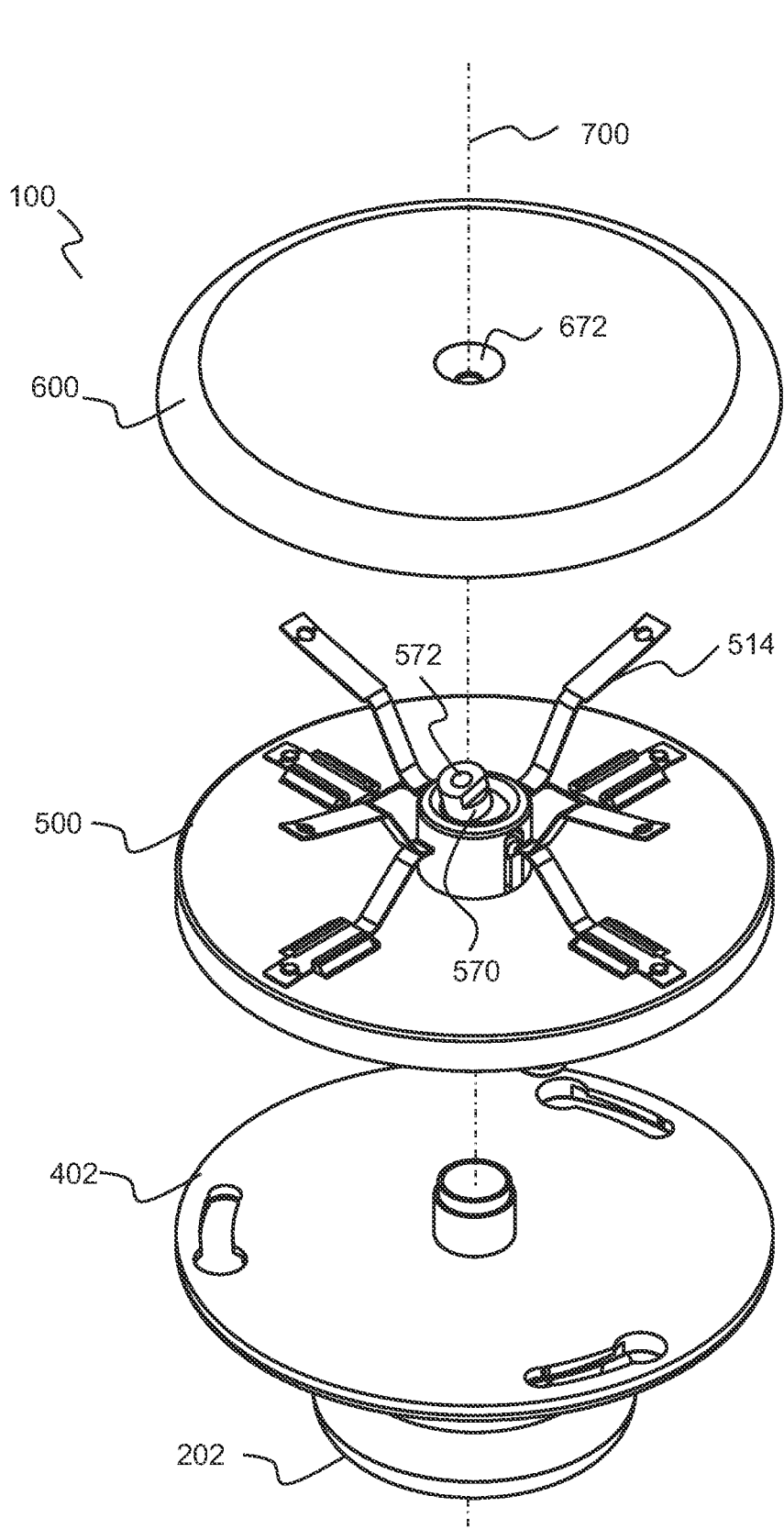

FIG. 53 is an example illustrating a schematic top perspective view of a hair removal device comprising a multi-angle deflector having a plurality of cantilevered springs.

Figure 54:
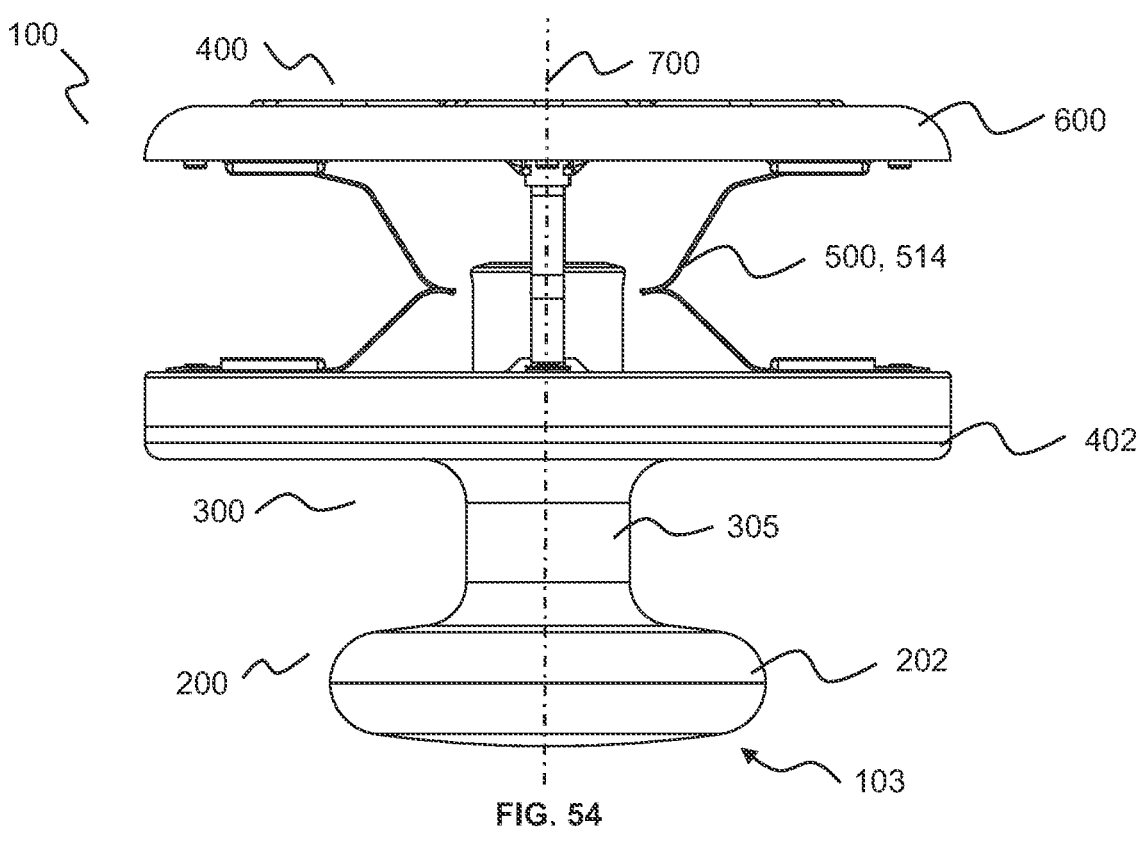

FIG. 54 is an example illustrating a schematic side view of a hair removal device comprising a multi-angle deflector having a plurality of cantilevered springs.

Figure 55:
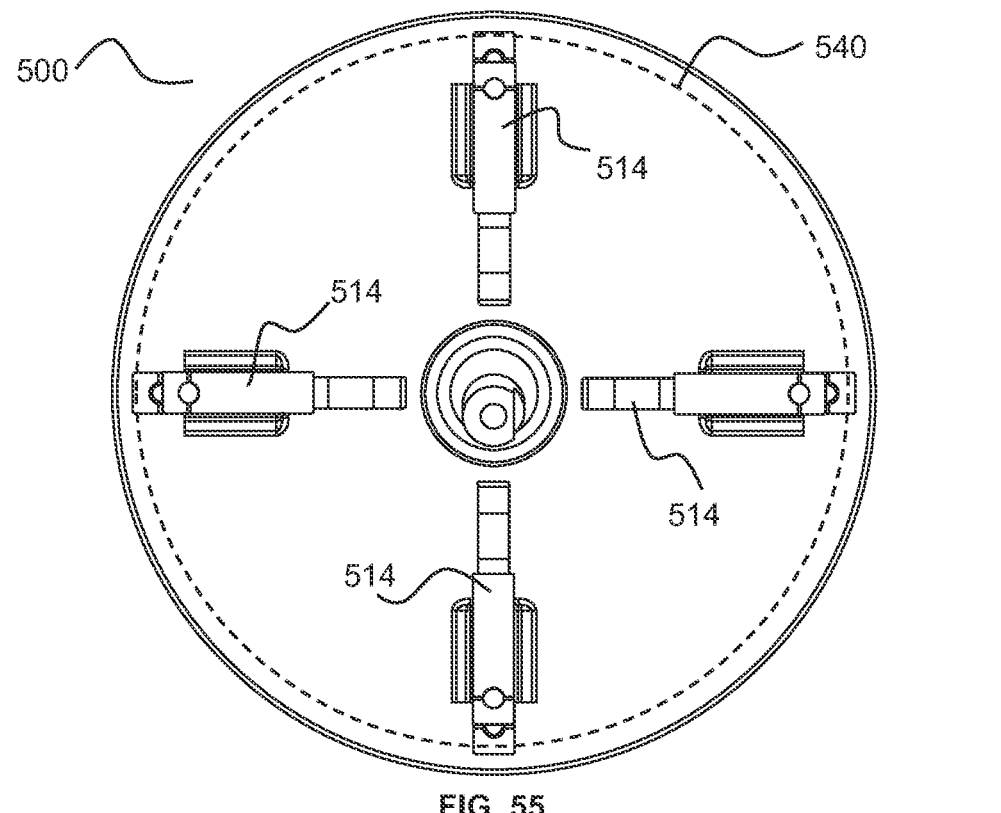

FIG. 55 is an example illustrating a schematic bottom view of a multi-angle deflector having a plurality of cantilevered springs.

Figure 56:
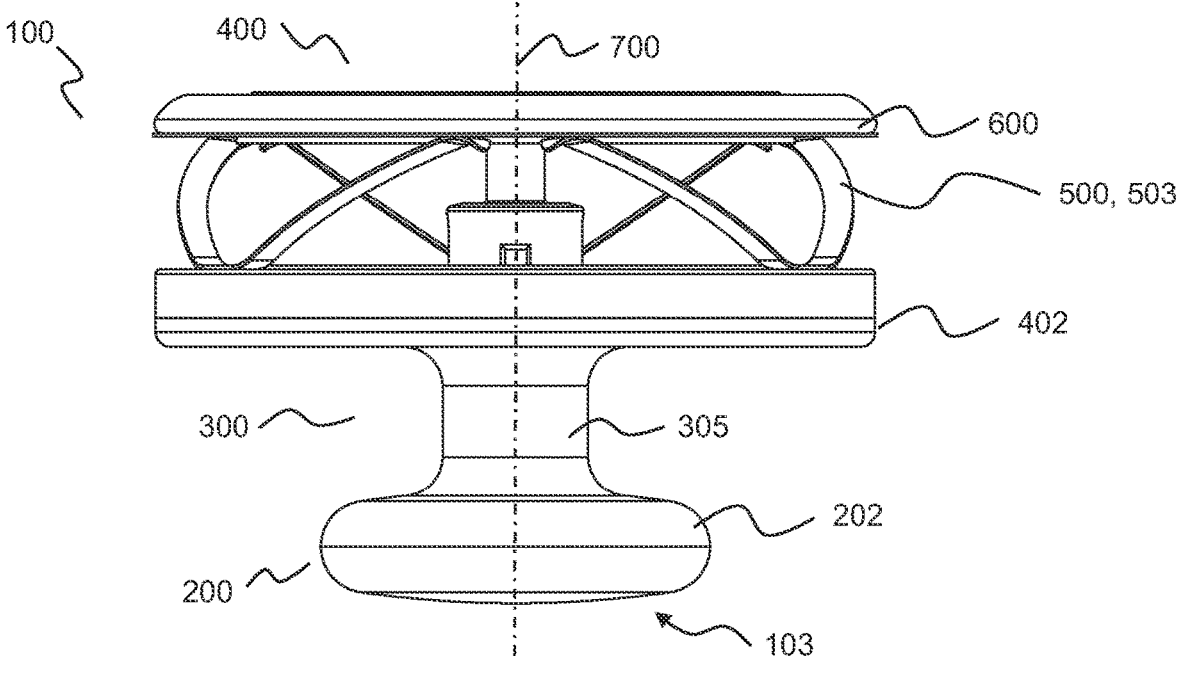

FIG. 56 is an example illustrating a schematic side view of a hair removal device comprising a multi-angle deflector comprising circumferential leaf springs.

Figure 57:
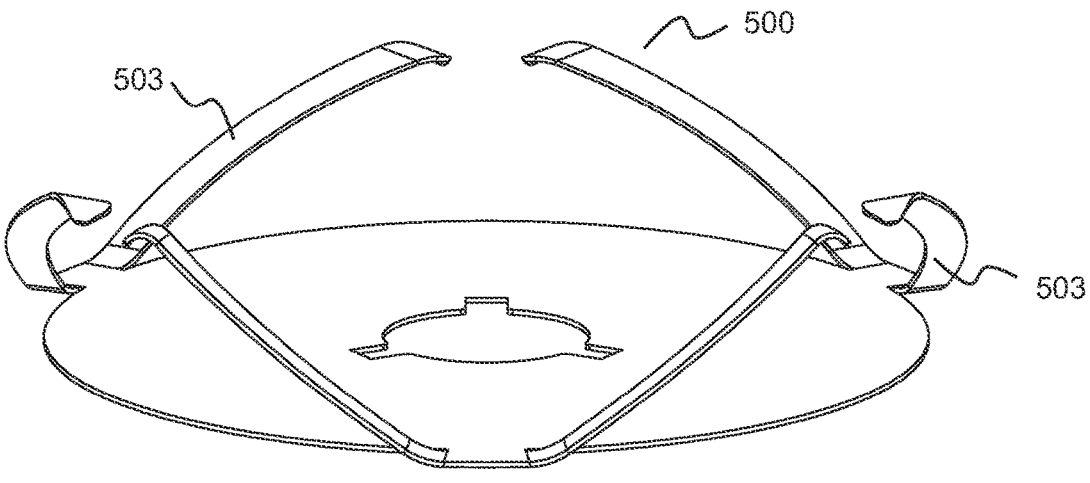

FIG. 57 is an example illustrating a schematic perspective view of a multi-angle deflector comprising circumferential leaf springs.

It should be understood that the various embodiments are not limited to the examples illustrated in the figures.

DETAILED DESCRIPTION OF THE INVENTION

Introduction and Definitions

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended Claims.

All the features disclosed in this specification (including any accompanying Claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the Claims that follow, the singular forms "a," "an," and "the" include plural referents unless the context clearly dictates otherwise. Thus, for example, reference to "a support" includes a plurality of supports. Particularly when a single countable noun is listed as an element in a Claim, this specification will generally use a phrase such as "a single." For example, "a single support."

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

In this specification and in the Claims that follow, reference will be made to a number of terms that shall be defined to have the following meanings unless a contrary intention is apparent.

"Disposed on" refers to a positional state indicating that one object or material is arranged in a position adjacent to the position of another object or material. The term does not require or exclude the presence of intervening objects, materials, or layers.

"Align" or "aligned" or "aligning" means to place or to arrange in a straight line. Aligning edges of substrates, therefore, means arranging the substrates so that the edges in question extend along approximately the same line. It is to be appreciated that aligning edges of substrates can be accomplished in a variety of ways, including placing the substrates one on top of the other or side by side.

"Facing relationship" refers to a relative positioning of materials, such as substrates, in which a surface of one material is oriented toward a surface of another material. For example, when two substrates are stacked on top of each other, they are in a facing relationship. The term does not require or exclude the presence of intervening objects, materials, or layers.

"Coupled" refers to a state of being linked or connected, indicating that one object or material is linked or connected to another object or material. The term does not require or exclude the presence of intervening objects, materials, or layers.

"Coupling" when used as a verb refers to an intervening object linking or connecting coupled objects.

"Perimeter" refers to the smallest circle that lies in a plane that is orthogonal to an alignment axis that completely encircles all portions of a structure.

Various Examples

FIG. 1, FIG. 2, FIG. 3, FIG. 4, FIG. 5, and FIG. 6 cooperate to illustrate a hair removal device 100 comprising a base 402, a multi-angle deflector 500 in the form of a wave spring 502, and an applicator head 600 comprising a hair removal surface 602. The applicator head 600 may support and/or surround the hair removal surface 602. Details about the multi-angle deflector 500 and the applicator head 600 will be discussed hereinafter.

Figure 1:
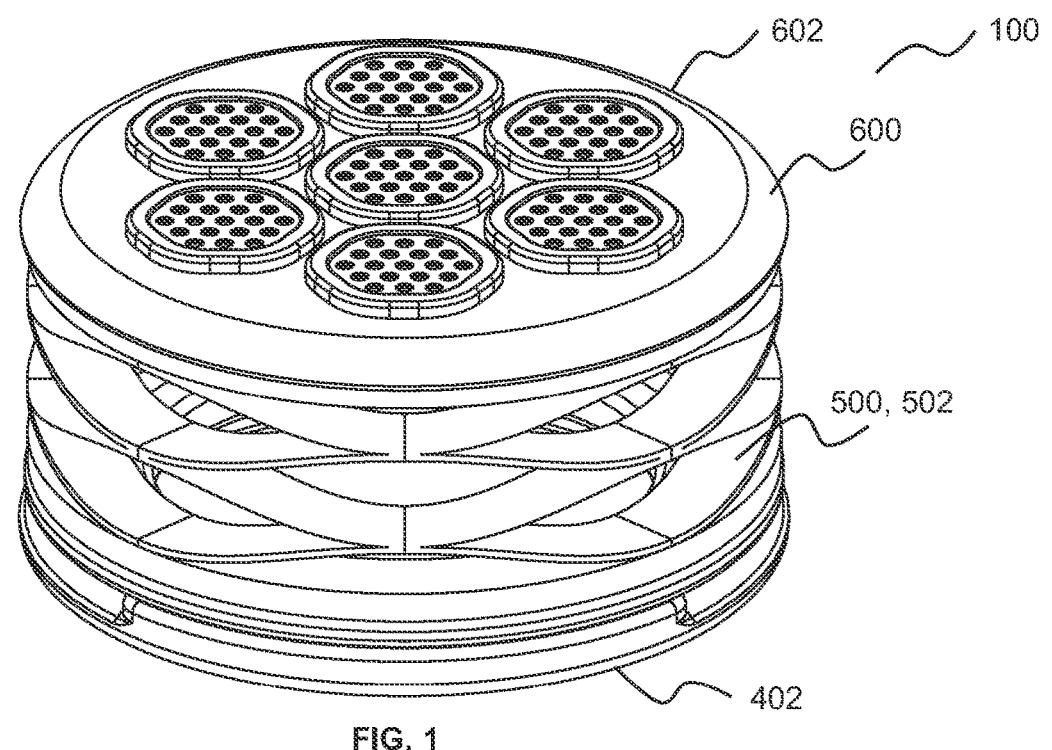
FIG. 1 is an example illustrating a schematic bottom perspective view of a hair removal device.
Figure 2:
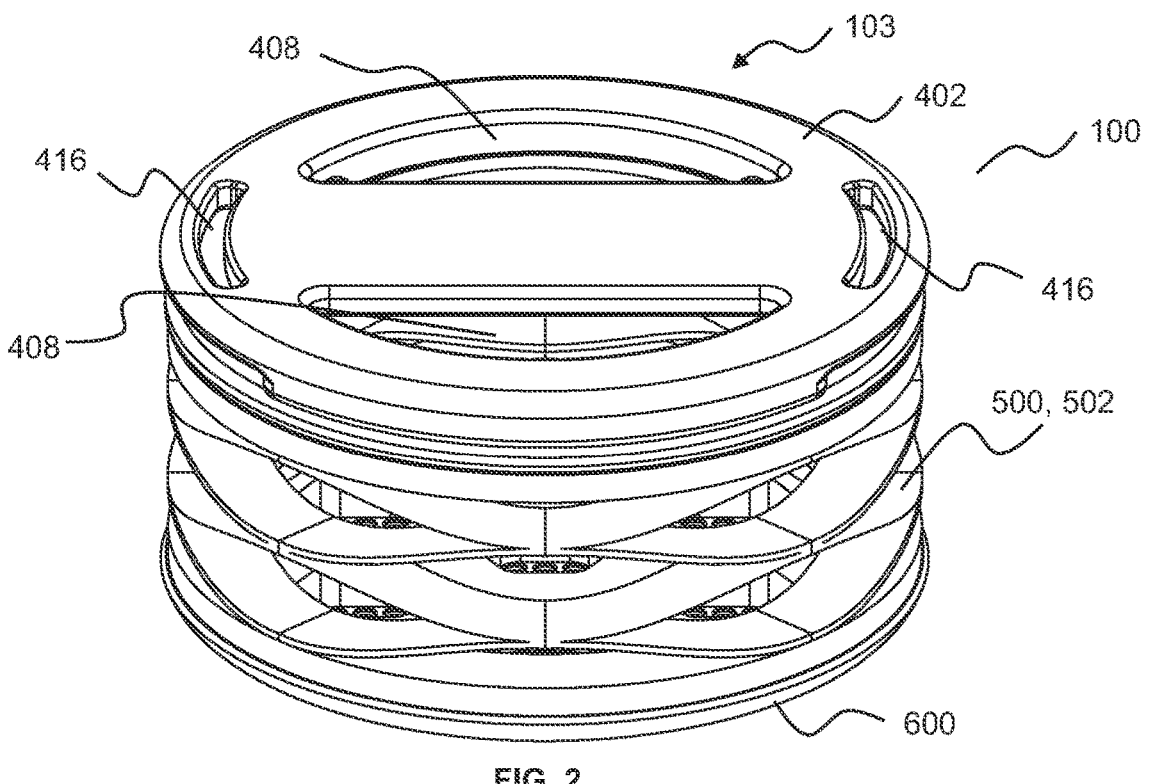
FIG. 2 is an example illustrating a schematic top perspective view of a hair removal device.

FIG. 1 provides a schematic bottom perspective view and FIG. 2 provides a schematic top perspective view of a hair removal device 100 in a fully assembled state. The hair removal device 100 illustrated is configured as a handheld or palm-held unit. As used herein, the terms "handheld" or "palm-held" imply a structure having a size that is suited to being grasped and manipulated with a single hand. The base 402 includes strap apertures 416 through which a strap (not shown) may be inserted. The strap may be used to secure the hair removal device 100 to a user's hand. The strap may employ a connection means such as hook and loop fasteners, snaps, or buckles. The strap may be elasticized to provide a comfortable and secure fit to a user's hand. It is to be appreciated that a variety of additional configurations of the base 402 are possible. The base 402 may also include one or more central apertures 408, which may facilitate rinsing, as will be discussed in greater detail hereinafter. As indicated in FIG. 2, the base 402 and/or any associated strap(s) may constitute a handheld portion 103 of the hair removal device. Other versions of a handheld portion 103 are possible, some of which will be discussed hereinafter.

Figure 3:
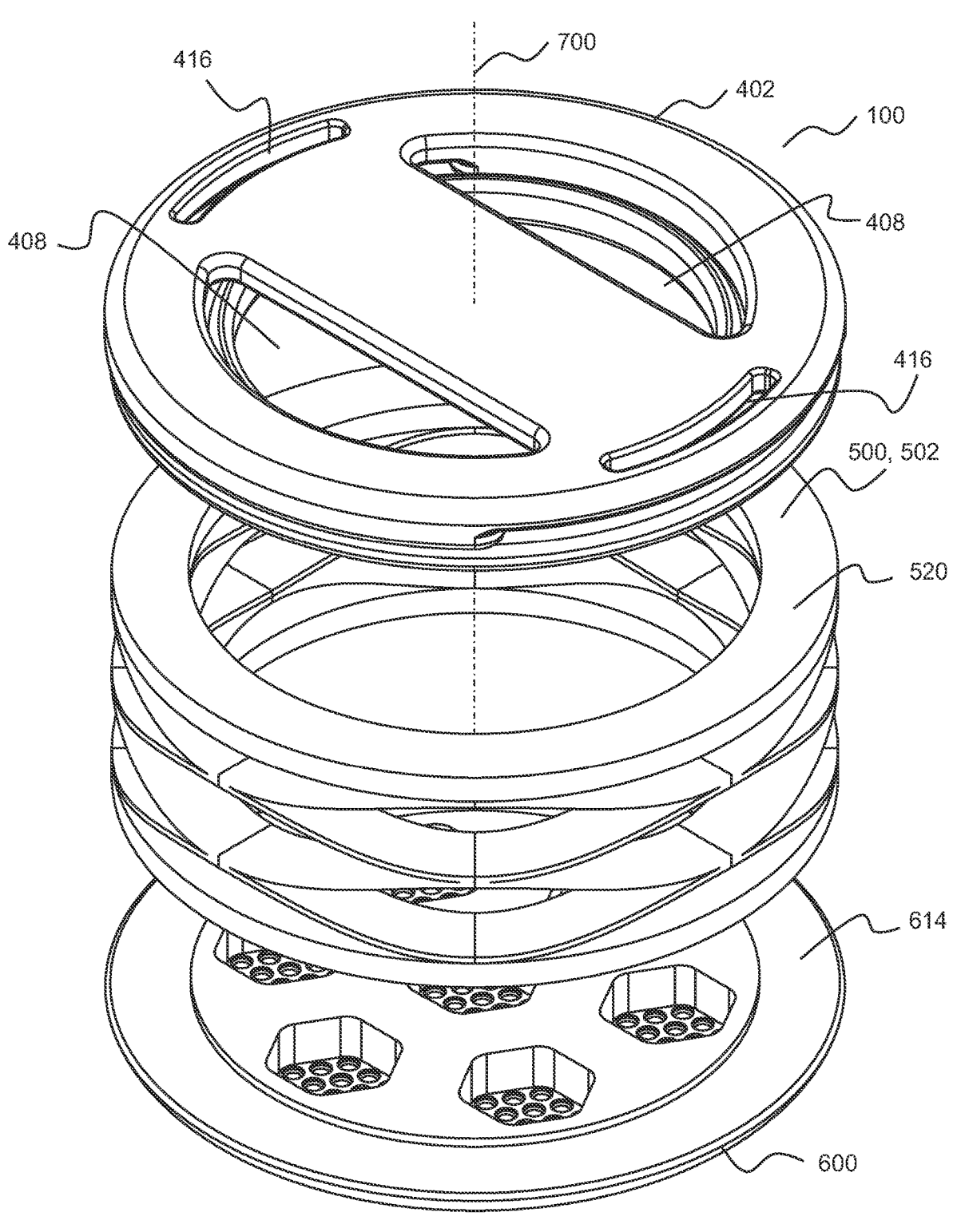
FIG. 3 is an example illustrating a schematic exploded top perspective view of a hair removal device.
Figure 4:
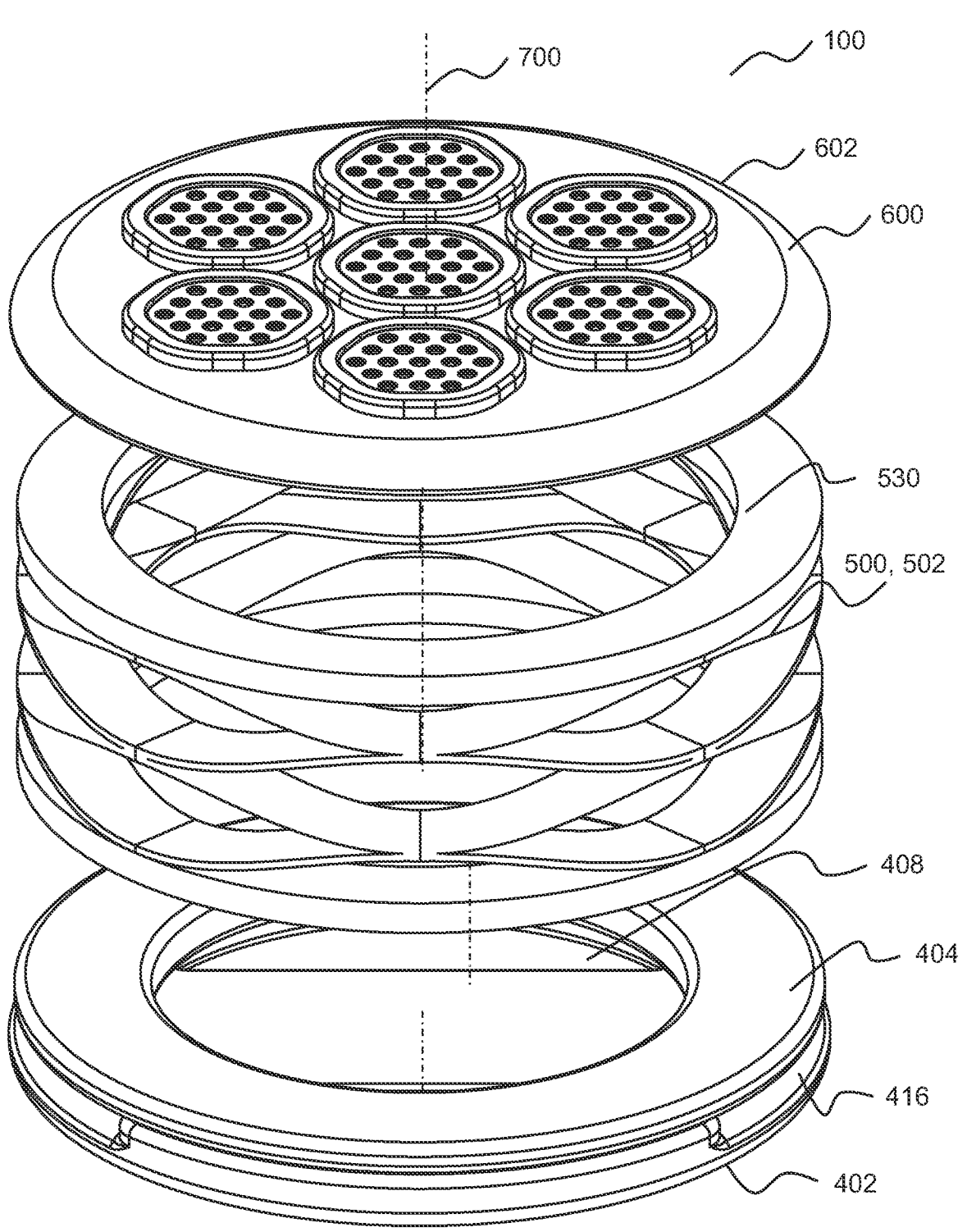
FIG. 4 is an example illustrating a schematic exploded bottom perspective view of a hair removal device.

FIG. 3 provides a schematic exploded top perspective view and FIG. 4 provides a schematic exploded bottom perspective view of a hair removal device 100. As shown in FIGS. 3 and 4, the base 402, the multi-angle deflector 500, and the applicator head 600 are aligned along an alignment axis 700. The multi-angle deflector 500 may comprise a deflector-applicator connection portion 530. Similarly, the applicator head 600 may comprise an applicator-deflector connection portion 614. The deflector-applicator connection portion 530 and the applicator-deflector connection portion 614 may be adapted to permanently or releasably couple the multi-angle deflector 500 to the applicator head 600. The deflector-applicator connection portion 530 and the applicator-deflector connection portion 614 may comprise any suitable connection mechanism, such as for example, snaps, threads, or magnets. An adhesive may also be applied to the deflector-applicator connection portion 530 and/or to the applicator-deflector connection portion 614 to adhere the multi-angle deflector 500 to the applicator head 600. Additionally, the multi-angle deflector 500 may comprise a deflector-base connection portion 520 and the base 402 may comprise a base-deflector connection portion 404, which may be adapted to permanently or releasably couple the multi-angle deflector 500 to the base 402. The deflector-base connection portion 520 and the base-deflector connection portion 404 may comprise any suitable connection mechanism, such as for example, snaps, threads, or magnets. An adhesive may also be applied to the deflector-base connection portion 520 and/or to the base-deflector connection portion 404 to adhere the multi-angle deflector 500 to the base 402. As a non-limiting example, the base-deflector connection portion 404 may comprise female threads and the deflector-base connection portion 520 may comprise corresponding male threads.

Figures 5, 6:
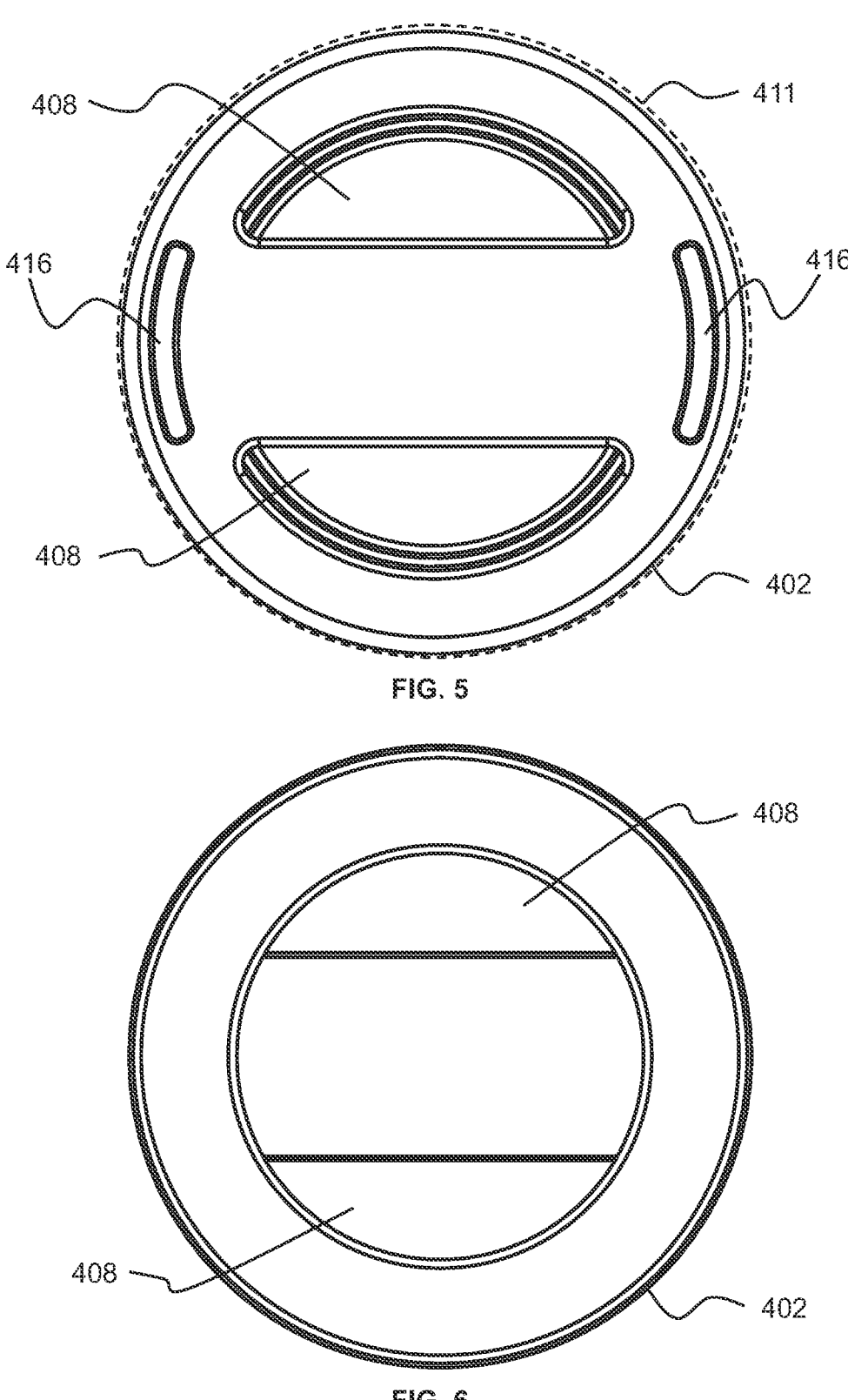
FIG. 5 is an example illustrating a schematic top view of a base for a hair removal device comprising strap apertures.
FIG. 6 is an example illustrating a schematic bottom view of a base for a hair removal device.

FIG. 5 provides a schematic top view and FIG. 6 provides a schematic bottom view of the base 402 for the hair removal device 100 comprising strap apertures 416. As shown in FIG. 5, a base encircling perimeter 411 may encircle the base 402 in a plane that is normal to the alignment axis 700. The base encircling perimeter 411 may be the smallest circle to completely encircle the base 402. The base encircling perimeter 411 may lie in a plane that is orthogonal to the alignment axis 700.

Figure 7:
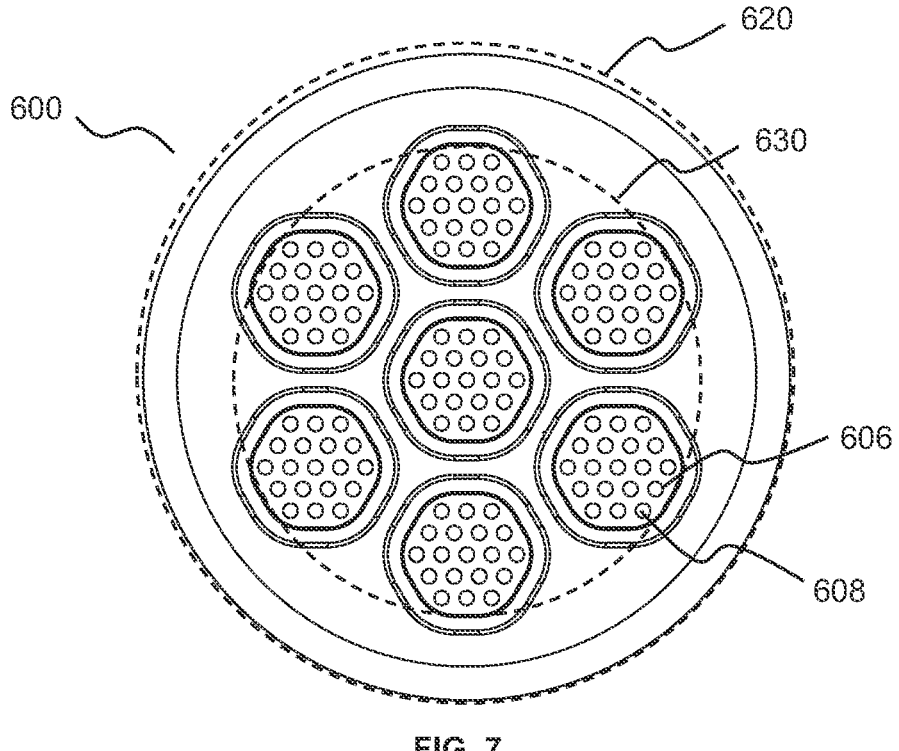
FIG. 7 is an example illustrating a schematic bottom view of an applicator head comprising a hair removal surface.
Figure 8:
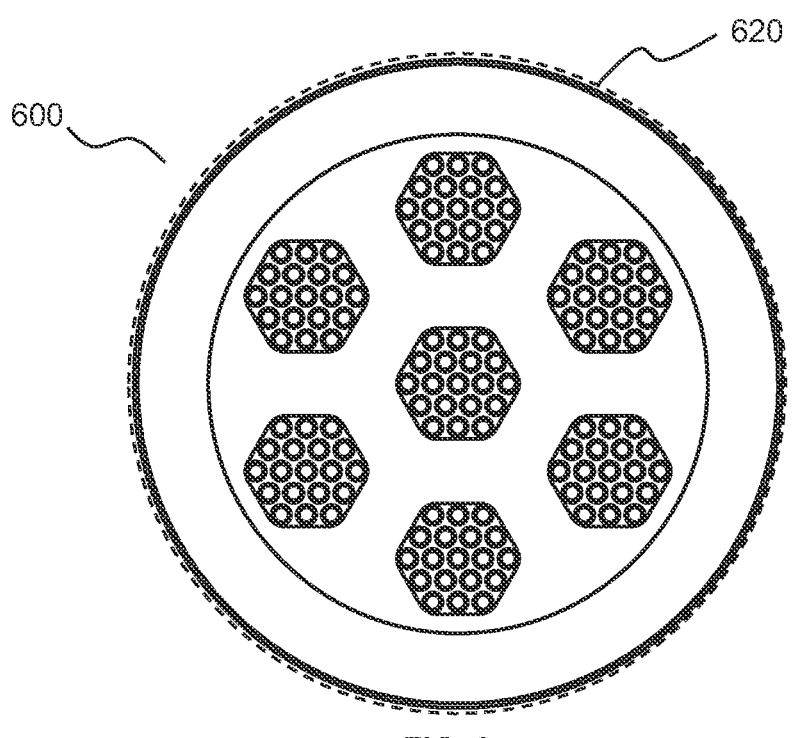
FIG. 8 is an example illustrating a schematic top view of an applicator head comprising a hair removal surface.
Figure 9:
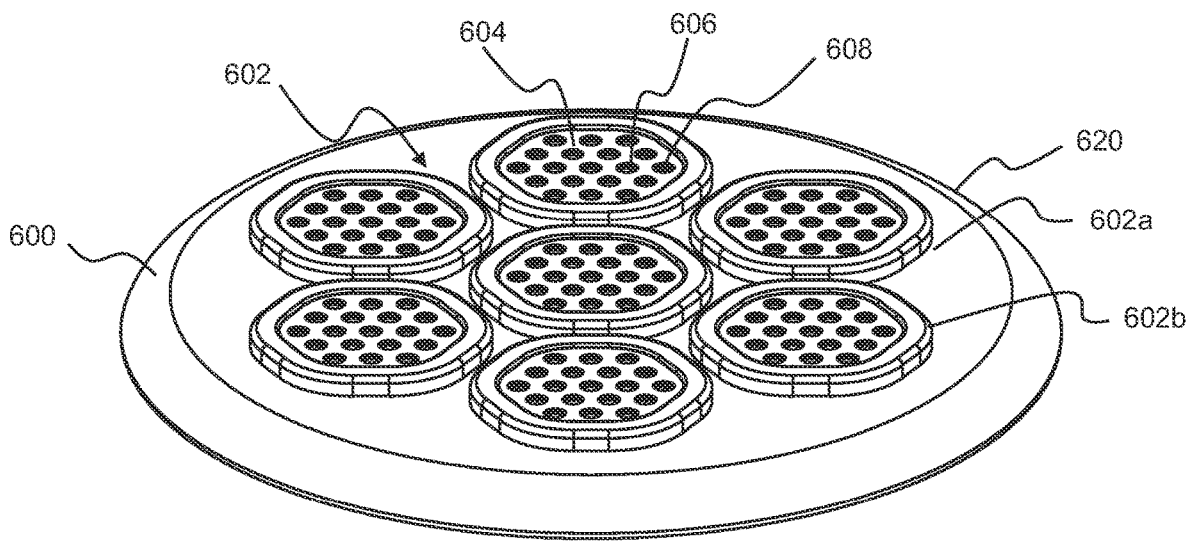
FIG. 9 is an example illustrating a schematic bottom perspective view of an applicator head comprising a hair removal surface.
Figure 10:
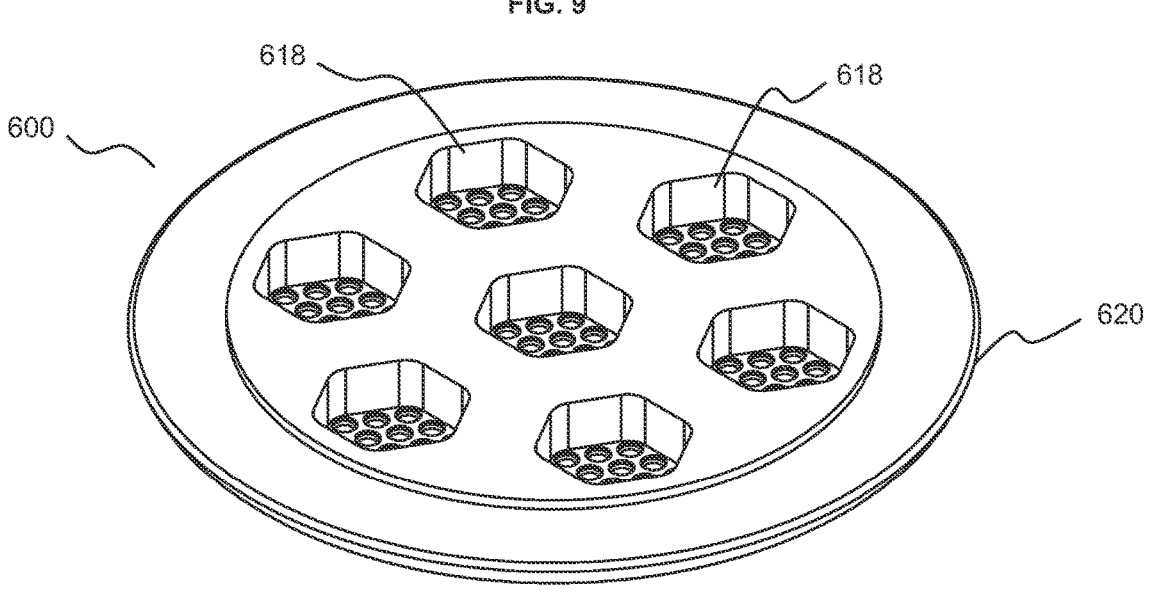
FIG. 10 is an example illustrating a schematic top perspective view of an applicator head comprising a hair removal surface.
Figure 11:
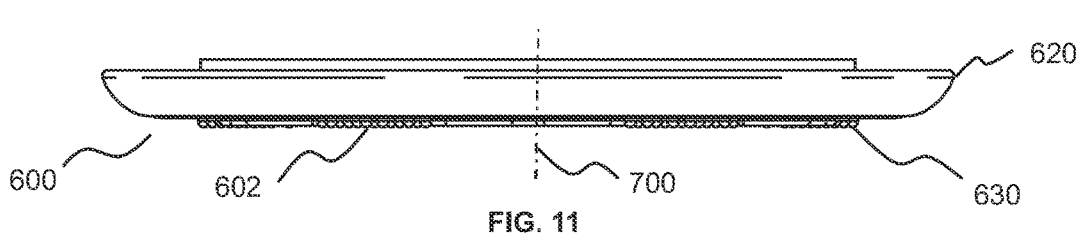
FIG. 11 is an example illustrating a schematic side view of an applicator head comprising a hair removal surface.
Figures 12, 13, 14, 15:
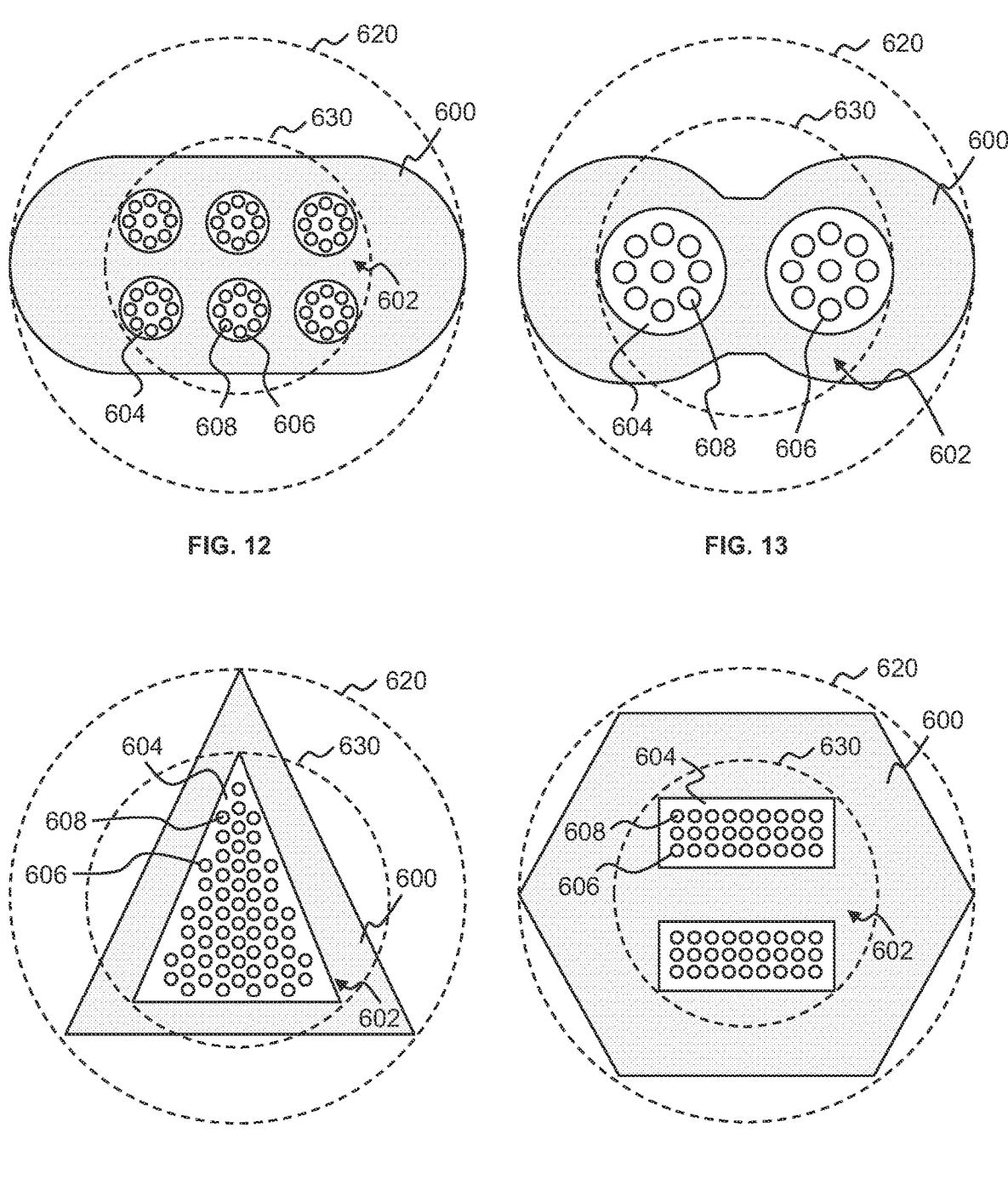
FIG. 12 is an example illustrating a schematic bottom view of an applicator head comprising a hair removal surface comprising a plurality of treatment sheets.
FIG. 13 is an example illustrating a schematic bottom view of an applicator head comprising a hair removal surface comprising a plurality of treatment sheets.
FIG. 14 is an example illustrating a schematic bottom view of an applicator head comprising a hair removal surface comprising a single treatment sheet.
FIG. 15 is an example illustrating a schematic bottom view of an applicator head comprising a hair removal surface comprising a plurality of treatment sheets.
Figures 16, 17, 18, 19:
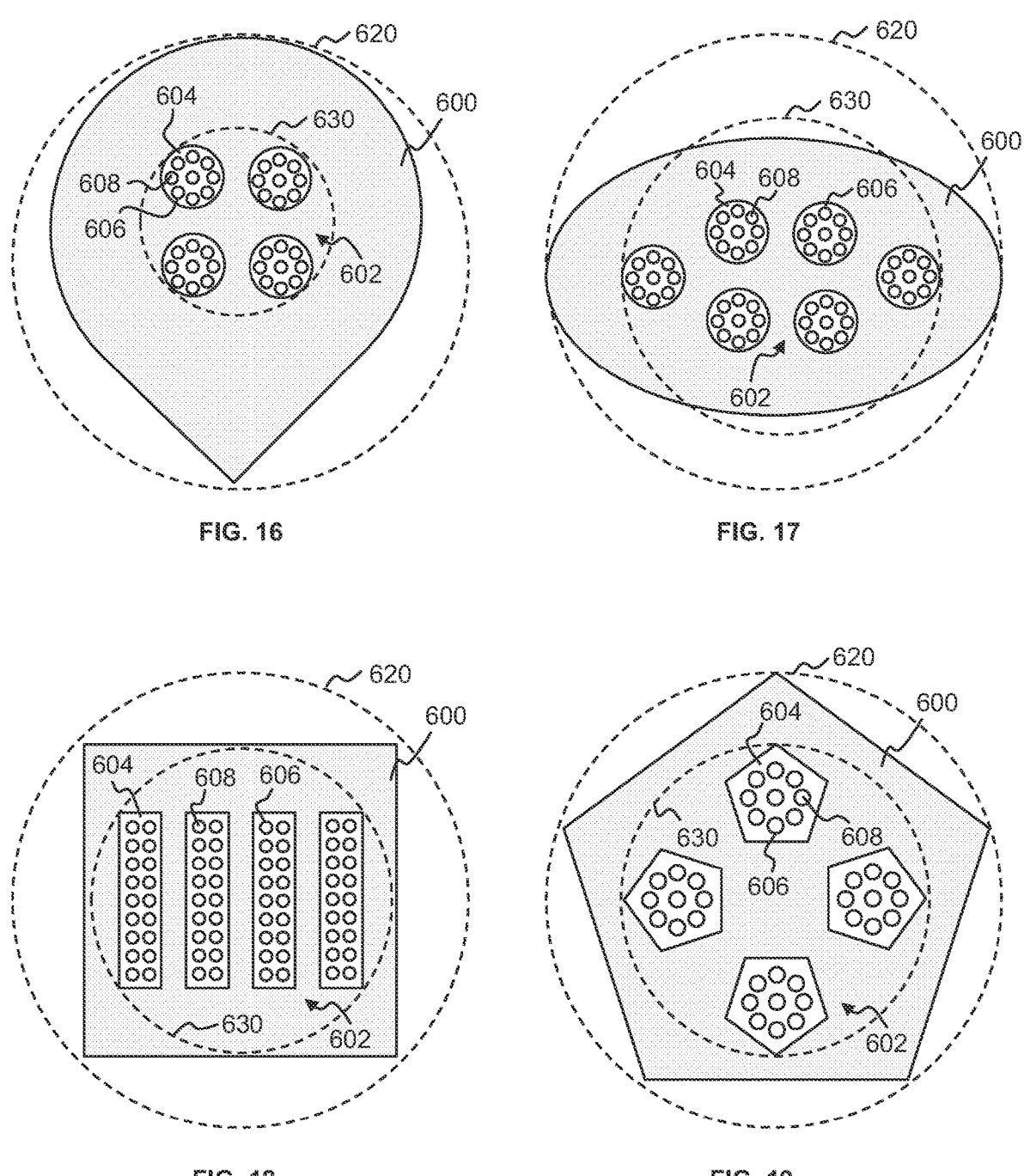
FIG. 16 is an example illustrating a schematic bottom view of an applicator head comprising a hair removal surface comprising a plurality of treatment sheets.
FIG. 17 is an example illustrating a schematic bottom view of an applicator head comprising a hair removal surface comprising a plurality of treatment sheets.
FIG. 18 is an example illustrating a schematic bottom view of an applicator head comprising a hair removal surface comprising a plurality of treatment sheets.
FIG. 19 is an example illustrating a schematic bottom view of an applicator head comprising a hair removal surface comprising a plurality of treatment sheets.

FIG. 7, FIG. 8, FIG. 9, FIG. 10, and FIG. 11 cooperate to illustrate the applicator head 600 and the hair removal surface 602. FIG. 7 provides a schematic bottom view, FIG. 8 provides a schematic top view, FIG. 9 provides a schematic bottom perspective view, FIG. 10 provides a schematic top perspective view, and FIG. 11 provides a schematic side view of an applicator head 600 comprising a hair removal surface 602. Referring to FIG. 7 and FIG. 8, an applicator head perimeter 620 may encircle the maximal extents of the applicator head 600 in a plane that is orthogonal to the alignment axis 700 (not shown). The applicator head perimeter 620 may be the smallest circle to completely encircle the applicator head 600. The applicator head 620 may comprise one or more treatment sheets 604. The hair removal surface perimeter 630 is defined as the smallest circle that encircles all of the treatment sheets 604. The hair removal surface 602 is the area on the applicator head 600 that is enclosed by the hair removal surface perimeter 630 and encloses the one or more treatment sheets 604.

Referring to FIG. 9, FIG. 10, and FIG. 11, the hair removal surface 602 may provide for the removal of hair, and may optionally provide for the removal of oil, debris, or dead skin cells. The hair removal surface 602 may include a plurality of treatment sheets 604, each of which may include one or more cutting edges 606 that surround and define one or more apertures 608. The cutting edges 606 may be enclosed, meaning that each cutting edge 606 encircles an aperture 608 and is surrounded by solid material comprising the treatment sheet 604. The cutting edges 606 may also be linear or non-linear, meaning that the cutting edges 606 may define any suitable shape, such as a circle, oval, ellipsoid, or an n-sided polygon, where n is from 3 to 20 sides. The treatment sheets 604 may comprise any suitable material, including but not limited to a metallic material. The non-linear cutting edges 606 may allow a hair to be cut when it extends into the associated aperture 608. Since the non-linear cutting edges 606 encircle the aperture 608, a hair may be cut when the treatment sheet 604 passes over it in any direction, allowing for multi-directional hair cutting. Multi-directional hair cutting is particularly beneficial in the context of back hair removal because a user of a back hair removal device 100 may have difficulty in moving the device 100 in a limited or consistent direction, for example, while reaching the device 100 over or under a shoulder to reach the back. Small apertures 608 deliver a safe shave as the skin cannot bulge into the opening which could cause nicks and cuts. The surface of the treatment sheet 604 around the apertures 608 also supports the skin reducing bulge and increasing safety. In other words, the apertures 608 may be sized to ensure that skin does not bulge into the aperture to be cut by the cutting edges 606. To facilitate rinsing of hair, oil, and/or debris from the apertures 608, the cutting edges 606, and/or the treatment sheets 604, the applicator head 600 may comprise a plurality of applicator head apertures 618.

FIG. 12, FIG. 13, FIG. 14, FIG. 15, FIG. 16, FIG. 17, FIG. 18, and FIG. 19 cooperate to illustrate various examples of an applicator head 600 comprising a hair removal surface 602. Each of these figures shows a hair removal surface 602 comprising a plurality of treatment sheets 604, except for FIG. 14, which shows a single treatment sheet 604. It is to be appreciated that a wide variety of configurations for both the applicator head 600 and the hair removal surface 602 are within the scope of this disclosure and that the illustrated variations are merely exemplary. As shown, an applicator head perimeter 620 may encircle each applicator head 600. Similarly, a hair removal surface perimeter 630 is the smallest circle that encircles the hair removal surface 602 that lies in a plane that is orthogonal to the alignment axis 700. The maximal extents of the hair removal surface 602 are typically defined by the outermost edges of the treatment sheet or treatment sheets 604.

FIG. 20, FIG. 21, and FIG. 22 cooperate to illustrate a multi-angle deflector 500. The multi-angle deflector 500 may have an open architecture which enables cut hairs and other debris to be rinsed away. FIG. 20 is an example illustrating a schematic side view of a multi-angle deflector 500 in the form of a wave spring 502. The wave spring 502 may comprise a plurality of leaf springs or shaped washers stacked and interconnected. The plurality of leaf springs may have a deflection stiffness ranging from 0.05 N/mm and 5 N/mm. It is to be appreciated that other configurations and types of multi-angle deflectors 500 may be employed, including but not limited to those described hereinafter. The wave spring 502 includes rinsing windows 552, a deflector-base connection portion 520, and a deflector-applicator connection portion 530. FIG. 21 is an example illustrating a schematic top view of a multi-angle deflector 500 as shown in FIG. 20. FIG. 22 is an example illustrating a schematic bottom view of a multi-angle deflector 500 as shown in FIGS. 20 and 21. A deflector perimeter 540 may encircle the maximal extents of the multi-angle deflector 500 in a plane that is orthogonal to the alignment axis 700.

Still referring to FIG. 20, FIG. 21, and FIG. 22, the multi-angle deflector 500 may comprise one or more central apertures 550 similar to and optionally cooperating with the one or more central apertures 408 of the base 402, as shown in FIG. 3. Cut hair and other debris may be rinsed by allowing water to pass through the central aperture 408 of the base 402 and into the central aperture 550 of the wave spring 502. The water may subsequently pass through one or more applicator head apertures 618, as shown in FIG. 10, and through the apertures 608 of the hair removal surface 602 and/or through the rinsing windows 552. Of course, the direction of water flow may be reversed or redirected as desired. For example, water may enter through the apertures 608 of the hair removal surface 602 or through the rinsing windows 552.

The multi-angle deflector 500 enables contact between the hair removal surface 602 and skin to be maintained across all areas of the body. This is useful when the user is unable to see. A multi-angle deflector 500 also helps maintain contact between the hair removal surface 602 and skin when moving over steeply contoured areas such as around the shoulder blades. Since the hair removal surface 602, described herein, may provide multi-directional hair cutting, the user may move the hair removal device 100 in any direction without having to maintain a consistent stroke pattern or direction. The combination of a hair removal surface 602 and a multi-angle deflector 500 enabling a three-dimensional pivoting movement for all points of the hair removal surface 602 enables the device to be used in any direction and maintain good contact with the contours of the skin. The multi-angle deflector 500 provides deflection in all planes enabling a controlled tipping motion as well as cushioning. This reduces the load on the cutting tip providing a safer shave. Moreover, the multi-angle deflector 500 enables the entirety of a cutting edge 606 to be used to cut hair, maximizing the efficiency and benefits of being able to cut in all directions. As previously discussed, the apertures 608 with a cutting edge 606 in one or more treatment sheets 604 allow the user to take strokes in any direction without worrying that a cutting edge 606 is perpendicular to the skin (e.g., to avoid slice cuts). Particularly when an applicator head 600 having such a hair removal surface 602 is used in combination with a multi-angle deflector 500, the user can move their arm freely in non-linear strokes like they would do if they were using a scrubber. Using a scrubbing motion; up, down, or sideways, reduces the time and effort taken compared to linear blades.

Figure 23:
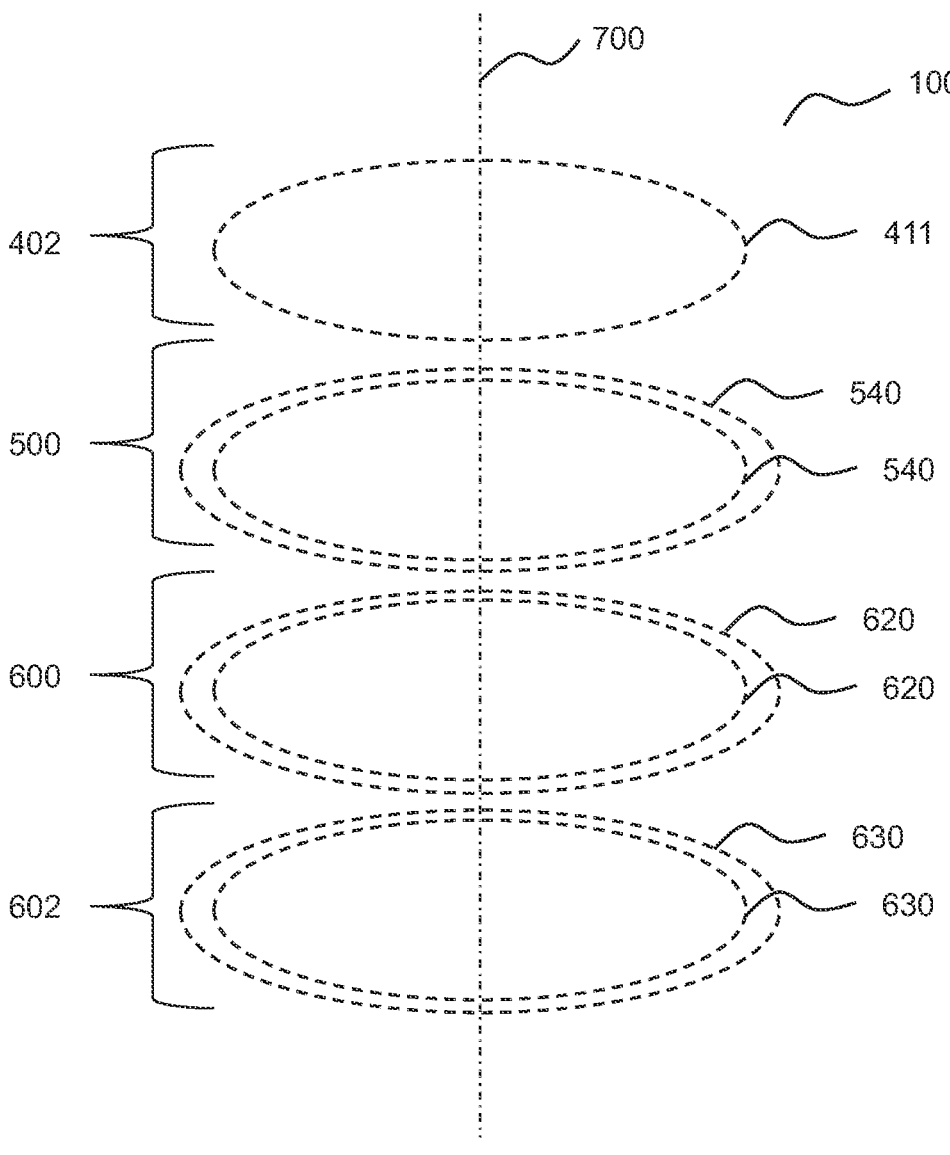
FIG. 23 is an example illustrating a schematic of various relevant perimeters of a hair removal device.

FIG. 23 is an example illustrating a schematic of various relevant perimeters of a hair removal device 100 according to any of the various examples described herein. A hair removal device 100 may comprise a base 402 having a base encircling perimeter 411. The hair removal device 100 may also comprise an applicator head 600, having an applicator head perimeter 620. The applicator head 600 may be coupled to the base 402 and may comprise a hair removal surface 602, having a hair removal surface perimeter 630. The hair removal device 100 may further comprise a multi-angle deflector 500 coupling the base 402 to the applicator head 600. The multi-angle deflector 500 may have a deflector perimeter 540.

The base encircling perimeter 411 may be any size, for example in some configurations it may be from 30 mm to 420 mm.

The deflector perimeter 540 may be any size, for example in some configurations it may be from 30 mm to 420 mm.

The applicator head perimeter 620 may be any size, for example in some configurations it may be from 30 mm to 420 mm.

The hair removal surface perimeter 630 may be any size, for example in some configurations it may be from 30 mm to 420 mm.

According to various configurations, the deflector perimeter 540 may be greater than or equal to the applicator head perimeter 620. To provide a non-limiting example, the deflector perimeter 540 may be greater than or equal to the applicator head perimeter 620 by 0% to 200%.

According to various configurations, the applicator head perimeter 620 may be greater than or equal to the base encircling perimeter 411. To provide a non-limiting example, the applicator head perimeter 620 may be greater than or equal to the base encircling perimeter 411 by 0% to 200%.

According to various configurations, the applicator head perimeter 620 may be greater than or equal to the hair removal surface perimeter 630. To provide a non-limiting example, the applicator head perimeter 620 may be greater than or equal to the hair removal surface perimeter 630 by 0% to 200%.

According to various configurations, the deflector perimeter 540 may be greater than or equal to the hair removal surface perimeter 630. To provide a non-limiting example, the deflector perimeter 540 may be greater than or equal to the hair removal surface perimeter 630 by 0% to 200%.

Having the perimeter of the multi-angle deflector 500 being similar or nearly close to the perimeter of the base 402, the applicator head 600 or hair removal surface 602 provides stability by ensuring that the deflection stiffness and compression is equal at all points around the perimeter of the hair removal surface 602 which helps provide a hair removal device 100 that is stable and that may be used in all directions, as opposed to just linear strokes.

Figure 24:
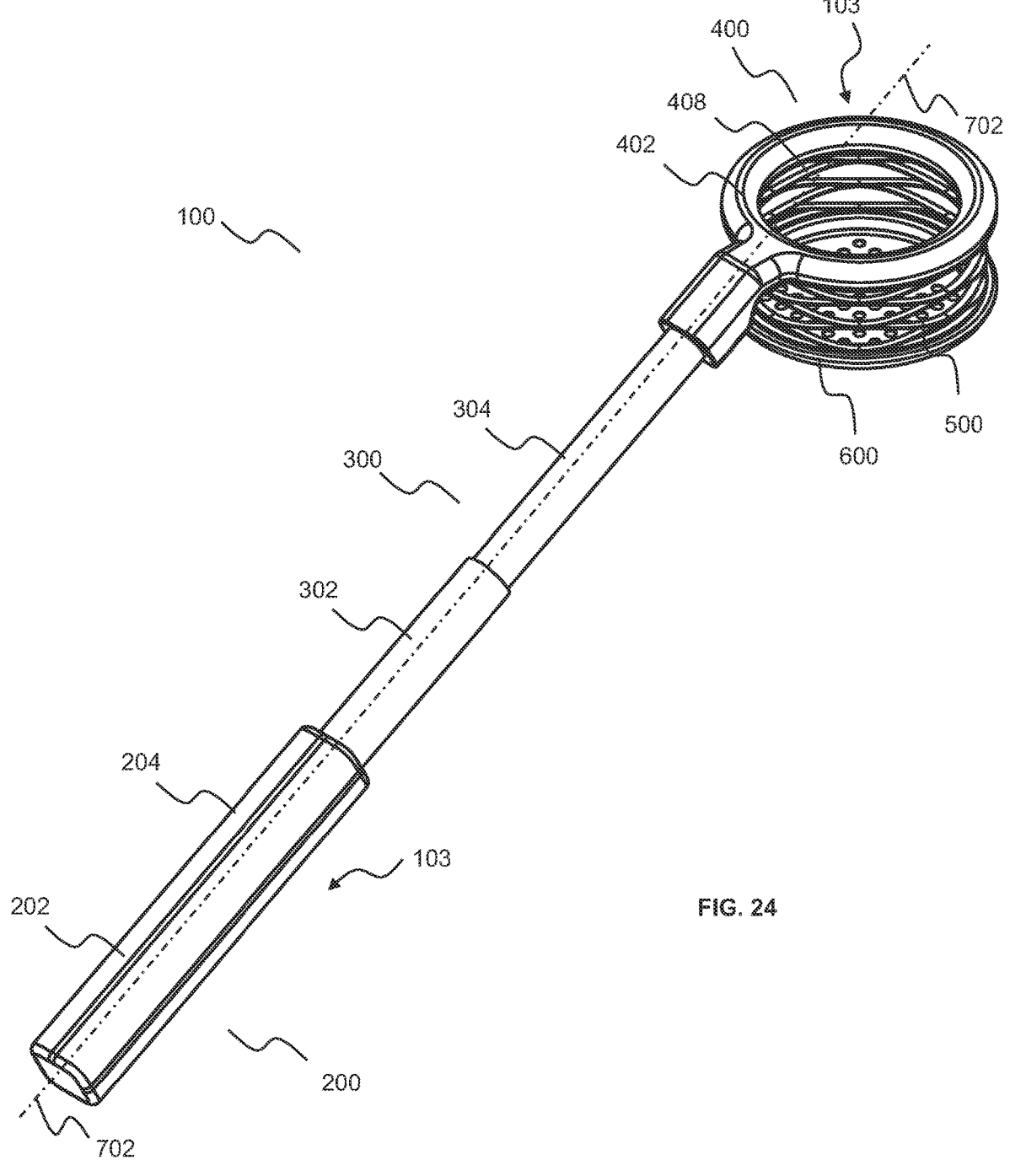
FIG. 24 is an example illustrating a schematic top perspective view of a hair removal device.

FIG. 24 is an example illustrating a schematic top perspective view of a hair removal device 100. The hair removal device 100 may include a proximal portion 200, a medial portion 300, and a distal portion 400, including the handheld portion 103, aligned along a longitudinal axis 702. The medial portion 300 may be disposed between the proximal portion 200 and the distal portion 400. The proximal portion 200 may include a handle 202. The handle 202 may provide an ergonomic shape, which may conform to a user's hand. The handle 202 may include a grip 204, including a texture to increase the coefficient of friction between a user's hand and the proximal portion 200 of the hair removal device 100, which may be particularly useful for a hair removal device 100 commonly used in the shower or in other wet conditions. The handle 202 and the grip 204 may comprise any suitable material or combination of materials, such as, for example, a plastic, a metal, or a combination thereof. Since the distal portion 400 may be detached or separable from the medial portion, the base 402 may also be a discrete, handheld portion 103. The medial portion 300 may be coupled to the proximal portion 200 and may comprise one or more segments, such as, for example, a first telescoping segment 302 and a second telescoping segment 304. The one or more segments may allow the medial portion 300 to be extendable, retractable, foldable, or compressible. The segments of the medial portion 300 may comprise any suitable material or combination of materials, such as, for example, a plastic, a metal, or a combination thereof. The distal portion 400 may be coupled to the medial portion 300. As will be discussed in greater detail, the distal portion 400 may comprise a base 402, a multi-angle deflector 500 coupled to the base 402, and an applicator head 600 coupled to the multi-angle deflector 500. The base 402, the multi-angle deflector 500 and the applicator head 600, as well as any subcomponents thereof, may comprise any suitable material or combination of materials, such as, for example, a plastic, a metal, or a combination thereof. As previously discussed, the multi-angle deflector 500 may be adapted to provide a multidirectional deflection connection of the applicator head 600 relative to the base 402.

Increasing the length of the hair removal device 100, for example via the plurality of telescoping segments, enables the user to reach all areas of their back. Modifying the length of the hair removal device 100 enables the user to set their desired length, tailoring the experience to their specific ergonomic requirements. The adjustable length also allows different lengths to be used for different areas of the back (e.g., the length required for removing hair from the shoulders may be different to the length required for removing hair around the middle of the spine). To enable the most difficult areas such as along the spine to be reached, the combined length of the proximal portion and the medial portion along the longitudinal axis 702 when fully extended may be between 1 cm and 75 cm. When fully collapsed, the combined length of the proximal portion and the medial portion along the longitudinal axis 702 may be between 0.5 cm and 70 cm, or from 10 cm to 50 cm. A collapsible or foldable medial portion also enables more discreet storage and improved travel options.

Figure 25:
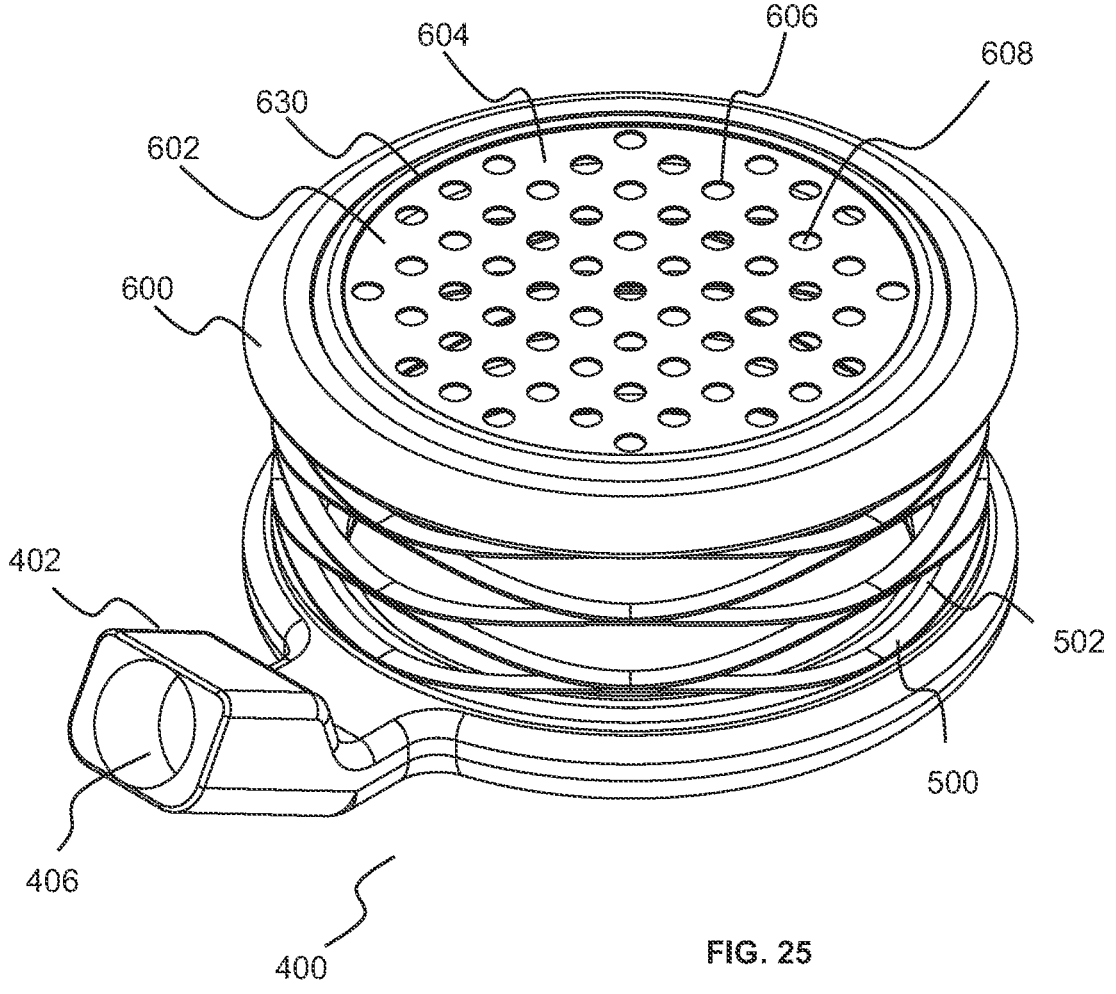
FIG. 25 is an example illustrating a schematic bottom perspective view of a distal portion of a hair removal device.

FIG. 25 is an example illustrating a schematic bottom perspective view of a distal portion 400 of a hair removal device 100. The distal portion 400 may comprise a base 402, a multi-angle deflector 500 coupled to the base 402, and an applicator head 600 coupled to the multi-angle deflector 500. The multi-angle deflector 500 may comprise a wave spring 502. The applicator head 600 may comprise or may be coupled to a hair removal surface 602. FIG. 25 also illustrates a base-handle connection portion 406 of the base 402. The base-handle connection portion 406 may provide a permanent or releasable connection between the base 402 and the medial portion 300. For example, the base-handle connection portion 406 may comprise male or female threads that engage a corresponding thread on one of the segments 302, 304 of the medial portion 300 as illustrated in FIG. 24. It is to be appreciated that any type of connection may be employed, including but not limited to a threaded connection or a friction connection.

Figure 26:
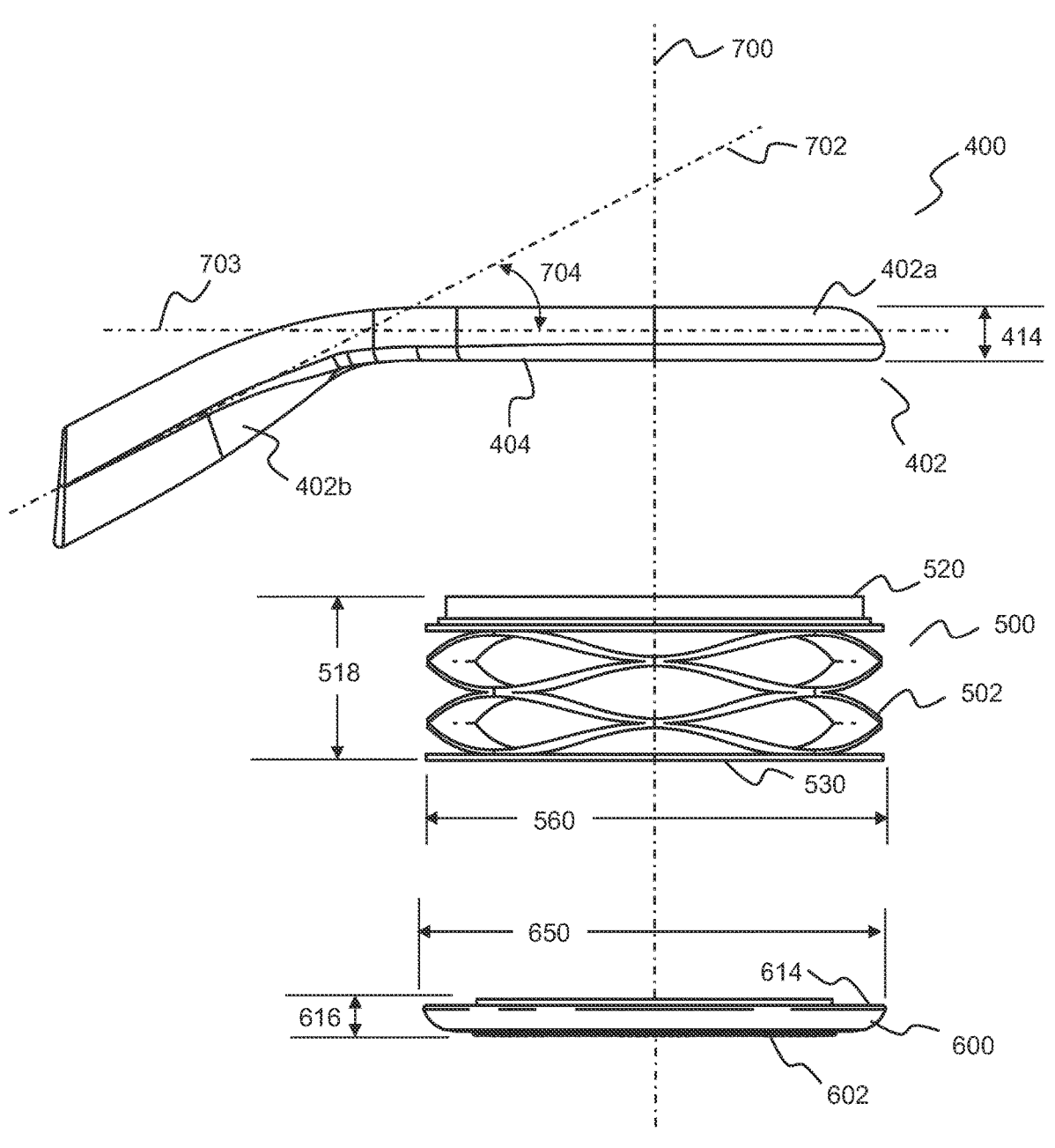
FIG. 26 is an example illustrating a schematic exploded side view of a distal portion of a hair removal device.

FIG. 26 is an example illustrating a schematic exploded side view of a distal portion 400 of a hair removal device 100. The base 402, the multi-angle deflector 500, and the applicator head are aligned along an alignment axis 700. More specifically, a first portion 402a of the base 402 is aligned along the alignment axis while a second portion 402b is not. The second portion 402b extends along a longitudinal axis 702 of the hair removal device 100 along which the medial portion 300 and the proximal portion 200 may be aligned and connected. A base longitudinal axis 703 may extend along the first portion of the base 402a. The base longitudinal axis 703 may be orthogonal to the alignment axis 700 and may be disposed at an angle 704 relative to the longitudinal axis 702. The angle 704 may be of any suitable degree, such as, for example, 5 to 80 degrees, or from 10 to 70 degrees, or from 20 to 60 degrees, or from 30 to 50 degrees, or about 45 degrees, specifically reciting all 0.5 degrees increments therebetween. The first portion 402a of the base 402 may have a base thickness 414, the multi-angle deflector 500 may have a deflector thickness 518, and the applicator head 600 may have an applicator head thickness 616. In a relaxed, non-compressed state, the multi-angle deflector thickness 518 may be greater than the base thickness 414 and/or greater than the applicator head thickness 616. According to various configurations, the thickness 518 of the multi-angle deflector 500 may also be substantially similar to the base thickness and/or the applicator head thickness. According to various configurations, the thickness 518 of the multi-angle deflector 500 may be 1 mm to 100 mm. The wave spring 502 may have a diameter 560 of 75 mm or from about 10 to 150 mm, which may be substantially similar or equal to a diameter 650 of the applicator head 600 to prevent the applicator head 600 catching on sharp contours which would otherwise cause a flipping or tipping effect (e.g., heeling up).

Figure 27:
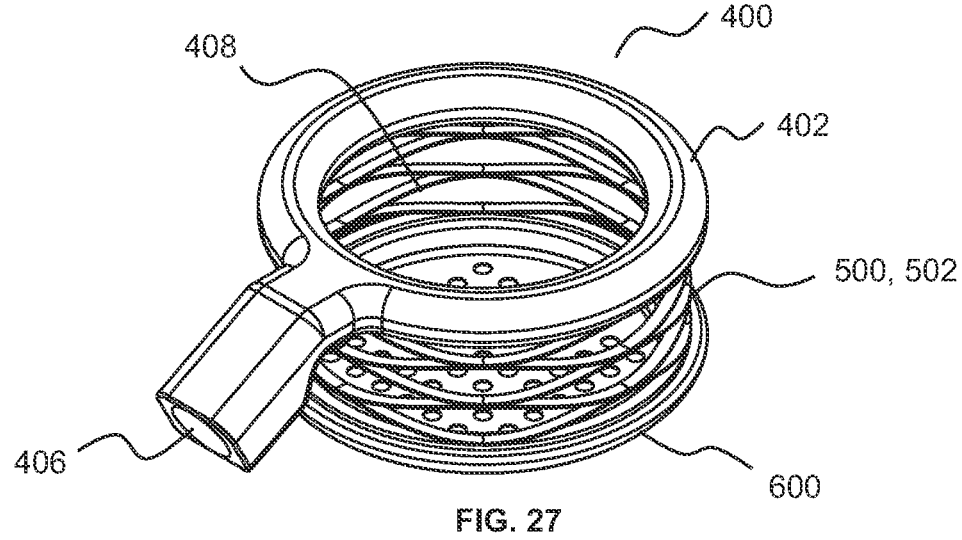
FIG. 27 is an example illustrating a schematic top perspective view of a distal portion of a hair removal device.
Figure 28:
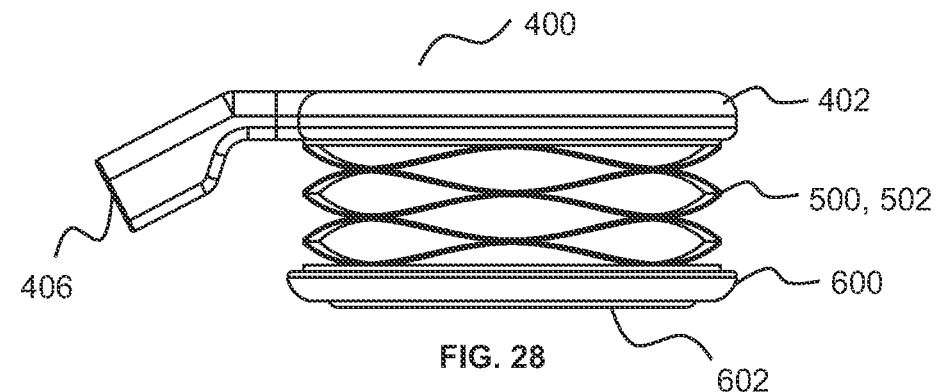
FIG. 28 is an example illustrating a schematic side view of a distal portion of a hair removal device.
Figure 29:
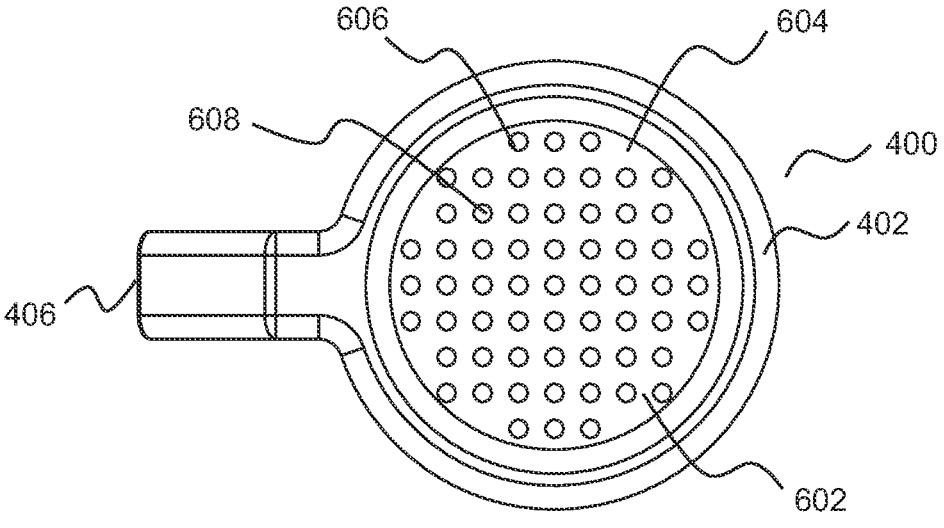
FIG. 29 is an example illustrating a schematic top view of a distal portion of a hair removal device.

FIG. 27, FIG. 28, and FIG. 29 cooperate to illustrate distal portion 400 of a hair removal device 100 comprising a base 402. FIG. 27 provides a schematic top perspective view, FIG. 28 provides a schematic side view, and FIG. 29 provides a schematic top view.

FIG. 30, FIG. 31, FIG. 32, FIG. 33, FIG. 34, FIG. 35, FIG. 36, FIG. 37, FIG. 38, FIG. 39, FIG. 40, and FIG. 41 cooperate to illustrate deflection and compression of the multi-angle deflector 500. FIGS. 30, 33, 36, and 39 provide schematic side views of a distal portion 400 of a hair removal device 100 in an uncompressed state, for example, without a load applied to the applicator head 600 and/or to the base 402. When in the uncompressed state, the multi-angle deflector 500 may have an uncompressed thickness 640. The uncompressed thickness 640 may be 1 mm to 100 mm. FIGS. 31, 34, 37, and 40 provide schematic side views of a distal portion 400 of a hair removal device 402 compressed at a compression angle 644 relative to an alignment axis 700. The compression angle 644 may be 0 to 60 degrees. Although the angle 644 is illustrated in a single plane, it is to be appreciated that the multi-angle deflector 500 may deflect in any direction relative to the alignment axis 700. Under such an uneven load, one portion of the multi-angle deflector 500 may maintain the uncompressed thickness 640, while another portion of the multi-angle deflector 500 may be compressed to a compressed thickness 642. The compressed thickness 642 may maintain at least some separation between the applicator head 600 and the base 402 or the compressed thickness 642 may allow the applicator head 600 and the base 402 to touch, which may be referred to as a "zero value" thickness.

Figures 30, 31, 32:
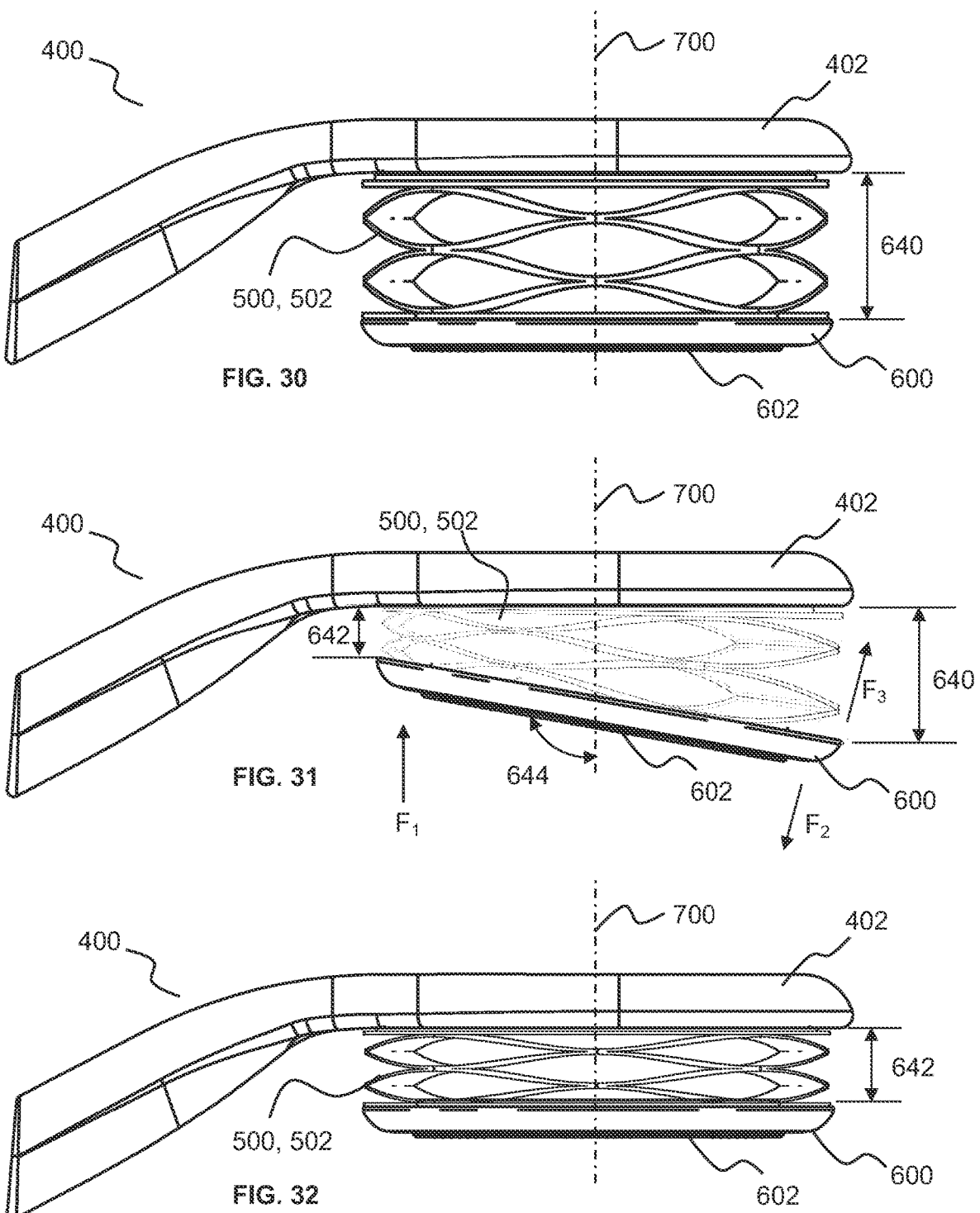
FIG. 30 is an example illustrating a schematic side view of a distal portion of a hair removal device in an uncompressed state.
FIG. 31 is an example illustrating a schematic side view of a distal portion of a hair removal device compressed at an angle relative to an alignment axis.
FIG. 32 is an example illustrating a schematic side view of a distal portion of a hair removal device compressed along an alignment axis.
Figures 33, 34, 35:
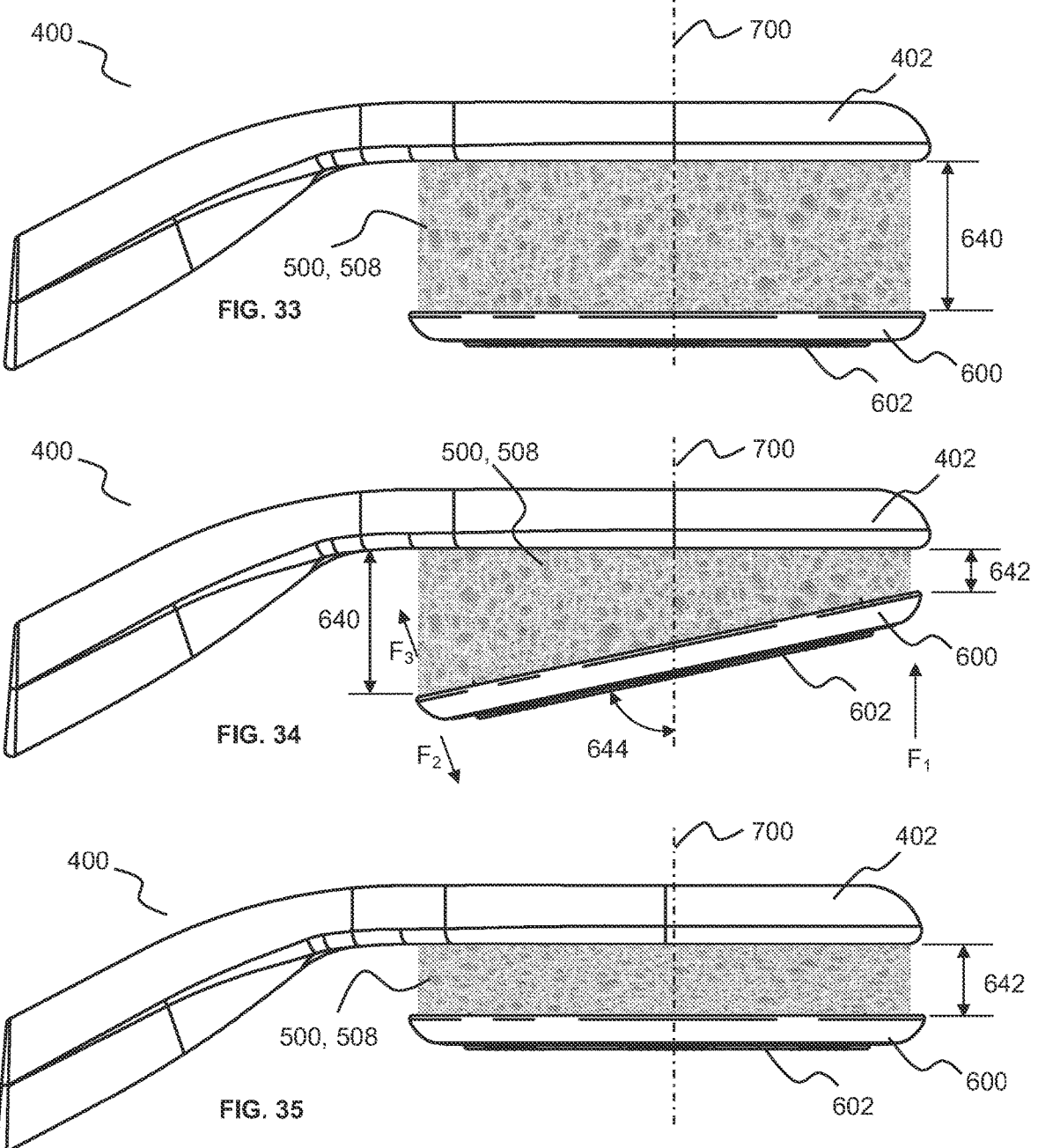
FIG. 33 is an example illustrating a schematic side view of a distal portion of a hair removal device in an uncompressed state.
FIG. 34 is an example illustrating a schematic side view of a distal portion of a hair removal device compressed at an angle relative to an alignment axis.
FIG. 35 is an example illustrating a schematic side view of a distal portion of a hair removal device compressed along an alignment axis.

FIGS. 32, 35, 38, and 41 provide schematic side views of a distal portion 400 of a hair removal device 402 compressed along an alignment axis 700. When compressed, the multi-angle deflector 500 may have a compressed thickness 642. The compressed thickness 642 may be 0 mm to 100 mm. In FIGS. 30, 31, and 32 the multi-angle deflector is a wave spring 502. The wave spring 502 may comprise a metal or rigid material. The wave spring 502 may be produced via any suitable method, including, for example, an additive manufacturing technique such as 3D printing or via metal forming. In FIGS. 33, 34, and 35 the multi-angle deflector is a sponge 508. The sponge 508 may comprise a natural or synthetic material. In FIGS. 36, 37, and 38 the multi-angle deflector is an elastomeric web 510. The elastomeric web 510 may comprise an elastomeric material. The elastomeric web 510 may be produced via any suitable method, including, for example, an additive manufacturing technique such as 3D printing. In FIGS. 39, 40, and 41 the multi-angle deflector is a deformable substrate 512. The deformable substrate 512 may comprise any material capable of providing the multi-angular compression and deflection described herein.

The multi-angle deflector 500 may have a compressive load range, representing its resistance to being compressed from an uncompressed thickness 640 to a compressed thickness 642 when the alignment axis is parallel with a direction of the force of gravity and the multi-angle deflector 500, with the applicator head 600 hanging freely. The compressive deflection stiffness in the present invention may be measured on an Instron 5965 electromechanical testing system or other testing standards such as, but not limited to, ASTM, ISO, or DIN. The compressive load range may be between 0.05 N/mm and 5 N/mm as measured when an upward force is applied at the center of the applicator head 600. Similarly, the multi-angle deflector 500 may have a deflection stiffness, representing its resistance to being deflected at an angle 644, when the alignment axis is parallel with a direction of the force of gravity and the multi-angle deflector 500, with the applicator head 600 hanging freely. The deflection stiffness may be between 0.05 N/mm and 5 N/mm as measured when an upward force is applied at the perimeter of the applicator head 600. The multi-angle deflector 500 may have a range of travel, defined as the difference between the uncompressed thickness 640 and the fully compressed thickness 642. The range of travel may be in a range of 1 mm to 100 mm.

Referring to FIG. 31, FIG. 34, FIG. 37, and FIG. 40, according to various configurations, the multi-angle deflector 500 may be compressed because of one or more non-uniform forces $F_1$ applied to the hair removal surface 602. The one or more non-uniform forces $F_1$ may be applied, for example, unevenly or only to one edge of the applicator head 600. A non-uniform force $F_1$ may result in a pivoting or see-sawing force $F_2$ at the opposite side of the applicator head 600. According to various configurations, this pivoting or see-sawing force $F_2$ may be balanced or countered by an opposing force $F_3$ from the multi-angle deflector 500, because the multi-angle deflector 500 may be coupled to the applicator head 600. A similar result may be obtained with a plurality of springs 504, or a plurality of cantilever springs 514, as discussed hereinafter. Therefore, according to various configurations, compression of the multi-angle deflector 500 in one region does not necessarily result in extension of the multi-angle deflector 500 in any other region, avoiding an uncontrolled seesawing motion of the hair removal surface 602. Even when subjected to forces $F_1$ in multiple directions, multi-angle deflectors 500 according to various configurations do not allow the hair removal surface 602 to tip away from the skin. For example, even if, the edge of the hair removal surface 602 or the applicator head 600 were to catch on the skin, for example due to areas of high friction, or on extreme contours of the body, the hair removal surface 602 is not flipped or tipped, which could lead to undesirable effects such as the underside edge of the applicator scratching the skin and reducing hair removal efficiency due to the hair removal surface no longer being in contact with the skin. Avoiding an uncontrolled seesawing motion may result in better contact between the hair removal surface and the skin, ensuring better hair removal efficiency and maintaining the ability to shave in multiple directions. Leaf springs or a wave spring, enable the applied force $F_1$ to be distributed evenly around the perimeter of the hair removal surface. This ensures that the multidirectional movement of the hair removal surface is smooth and therefore avoiding any sudden movement of the blades relative to the skin which may cause nicks and cuts.

FIG. 42, FIG. 43, FIG. 44, FIG. 45, and FIG. 46 cooperate to illustrate a multi-angle deflector 500 comprising a plurality of springs 504 as well as a deflector perimeter 540 defined with respect to the plurality of springs 504. FIG. 42 and FIG. 43 provide schematic bottom perspective views of hair removal devices 100 comprising multi-angle deflectors 500 comprising a plurality of springs 504. FIG. 44 provides a schematic side view the hair removal device 100 shown in FIG. 42.

Referring to FIG. 42 and FIG. 43, the hair removal device 100 includes an applicator head 600, a multi-angle deflector 500, a base 402, and a handle 202 aligned along an alignment axis. The multi-angle deflector 500 may comprise a ball and socket pivot 570. The applicator head 602 may comprise a screw or other aperture 672 aligned and cooperating with a threaded portion 572 of the ball and socket pivot 570. The ball and socket pivot 570 may allow the applicator head 600 to pivot in any direction while remaining attached to the multi-angle deflector. A plurality of springs 504 may be disposed around the ball and socket pivot 570 to bias the applicator head 600 into a neutral position that is approximately parallel to the multi-angle deflector 500 and in a plane orthogonal to the alignment axis 700.

Referring to FIG. 44, the hair removal device 100 includes a proximal portion 200, a medial portion 300, and a distal portion 400 aligned along the alignment axis 700, along which the applicator head 600, the multi-angle deflector 500, and the base 402 are aligned. The medial portion 300 includes only a single segment 305. The proximal portion 200 includes a handle 202 with a knob shape. It is to be appreciated that any version of the hair removal device 100 described herein may employ a similar configuration for the proximal portion 200, medial portion 300, and distal portion 400. Similarly, it is to be appreciated that the multi-angle deflector 500 comprising a plurality of springs 504 may be employed in any configuration of the hair removal device 100 described herein.

FIG. 45 and FIG. 46 provide schematic bottom views of a multi-angle deflector 500 having a plurality of springs 504. The deflector perimeter 540 of a multi-angle deflector 500 comprising a plurality of springs 504 may encircle the maximal extents of the plurality of springs 504 in a plane that is orthogonal to the alignment axis 700.

FIG. 47 is a schematic perspective view of a hair removal device 100 comprising a multi-angle deflector 500 comprising plurality of springs 504, showing the applicator head 600 in a deflected state. As shown in FIG. 47, non-uniform compression of the multi-angle deflector 500 in one region does not result in extension of the multi-angle deflector in any other region, therefore, avoiding an uncontrolled see-sawing motion of the hair removal surface 602. A non-uniform force $F_1$ may result in a pivoting or see-sawing force $F_2$ at the opposite side of the applicator head 600. According to various configurations, this pivoting or see-sawing force $F_2$ may be balanced or countered by an opposing force $F_3$ from the multi-angle deflector 500, because the multi-angle deflector 500 may be coupled to the applicator head 600, via one or more of the plurality of springs 504.

FIG. 48, FIG. 49, FIG. 50, and FIG. 51 cooperate to illustrate a multi-angle deflector 500 comprising a plurality of deflection arms 506 as well as a deflector perimeter 540 defined with respect to the plurality of deflection arms 506. FIG. 48 provides a schematic bottom perspective view and FIG. 49 provides a schematic side view of a hair removal device 100 comprising a multi-angle deflector 500 having a plurality of deflection arms 506. Referring to FIG. 48, the multi-angle deflector 500 may comprise a ball and socket pivot 570. The applicator head 602 may comprise a screw aperture 672 aligned and cooperating with a threaded portion 572 of the ball and socket pivot 570. The ball and socket pivot 570 may allow the applicator head 600 to pivot in any direction while remaining attached to the multi-angle deflector. A plurality of deflection arms 506 may be disposed around the ball and socket pivot 570 and optionally attached thereto. The deflection arms 506 may bias the applicator head 600 into a neutral position that is approximately parallel to the multi-angle deflector 500 and in a plane orthogonal to the alignment axis 700.

Referring to FIG. 49, the hair removal device 100 may include a proximal portion 200, a medial portion 300, and a distal portion 400 aligned along the alignment axis 700, along which the applicator head 600, the multi-angle deflector 500, and the base 402 are aligned. The medial portion 300 includes only a single segment 305. The proximal portion 200 includes a handle 202 with a knob shape. It is to be appreciated that any version of the hair removal device 100 described herein may employ a similar configuration for the proximal portion 200, medial portion 300, and distal portion 400. Similarly, it is to be appreciated that the multi-angle deflector 500 comprising a plurality of deflection arms 506 may be employed in any configuration of the hair removal device 100 described herein.

FIG. 50 provides a schematic bottom view of a multi-angle deflector 500 having a plurality of deflection arms 506. The deflector perimeter 540 of a multi-angle deflector 500 comprising a plurality of deflection arms 506 may encircle the maximal extents of the plurality of deflection arms 506 in a plane that is orthogonal to the alignment axis 700.

FIG. 51 is a schematic side view of a hair removal device 100 comprising a multi-angle deflector 500 comprising a plurality of deflection arms 506, showing the applicator head 600 in a deflected state. A non-uniform force $F_1$ may result in a pivoting or see-sawing force $F_2$ at the opposite side of the applicator head 600. Unlike other configurations wherein this pivoting or see-sawing force $F_2$ is balanced or countered by an opposing force $F_3$ from the multi-angle deflector 500, the multi-angle deflector 500 is not coupled to the applicator head 600, via one or more of the plurality of deflection arms 506. Instead, the stiffness of the deflection arms 506 may be calibrated to ensure that even under a non-uniform force $F_1$ that deflects the applicator head 600 to a maximum extent, all of deflection arms 506 maintain contact with the applicator head 600. Thus, a non-uniform compression of the multi-angle deflector 500 in one region does not result in extension of the multi-angle deflector in any other region, therefore, avoiding an uncontrolled seesawing motion of the hair removal surface 602.

A situation to be avoided is shown in FIG. 52, which is a schematic side view of a hair removal device 100 comprising a multi-angle deflector 500 comprising a plurality of deflection arms 506, showing the applicator head 600 in a deflected state during an uncontrolled seesawing. The non-uniform force $F_1$ deflects the applicator head 600 resulting in a pivoting or see-sawing force $F_2$ at the opposite side of the applicator head 600. Since the stiffness of the deflection arms 506 is not properly calibrated, at least one of the deflection arms 506 loses contact with the applicator head 600, forming a gap 580. This is an undesirable configuration which could lead to an uncontrolled seesawing effect that could lead to nicks and cuts as previously discussed.

FIG. 53, FIG. 54, and FIG. 55 cooperate to illustrate a multi-angle deflector 500 comprising a plurality of cantilevered springs 514 as well as a deflector perimeter 540 defined with respect to the plurality of cantilevered springs 514. FIG. 53 provides a schematic bottom perspective view and FIG. 54 provides a schematic side view of a hair removal device 100 comprising a multi-angle deflector 500 having a plurality of cantilevered springs 514. The multi-angle deflector 500 may comprise a ball and socket pivot 570. The applicator head 602 may comprise a screw aperture 672 aligned and cooperating with a threaded portion 572 of the ball and socket pivot 570. The ball and socket pivot 570 may allow the applicator head 600 to pivot in any direction while remaining attached to the multi-angle deflector. A plurality of cantilever springs 514 may be disposed around the ball and socket pivot 570 to bias the applicator head 600 into a neutral position that is approximately parallel to the multi-angle deflector 500 and in a plane orthogonal to the alignment axis 700.

Referring to FIG. 54, the hair removal device 100 may include a proximal portion 200, a medial portion 300, and a distal portion 400 aligned along the alignment axis 700, along which the applicator head 600, the multi-angle deflector 500, and the base 402 are aligned. The medial portion 300 includes only a single segment 305. The proximal portion 200 includes a handle 202 with a knob shape. It is to be appreciated that any version of the hair removal device 100 described herein may employ a similar configuration for the proximal portion 200, medial portion 300, and distal portion 400. Similarly, it is to be appreciated that the multi-angle deflector 500 comprising a plurality of cantilevered springs 514 may be employed in any configuration of the hair removal device 100 described herein. FIG. 55 provides a schematic bottom view of a multi-angle deflector 514 having a plurality of cantilevered springs 514. The deflector perimeter 540 of a multi-angle deflector 500 comprising a plurality of cantilevered springs 514 may encircle the maximal extents of the plurality of cantilevered springs 514 in a plane that is orthogonal to the alignment axis 700. As in other similar configurations, a non-uniform force $F_1$ may result in a pivoting or see-sawing force $F_2$ at the opposite side of the applicator head 600, which may be balanced or countered by an opposing force $F_3$ from the multi-angle deflector 500, because the multi-angle deflector 500 may be coupled to the applicator head 600, via one or more of the cantilever springs 514.

Referring to FIG. 56, the hair removal device 100 may include a proximal portion 200, a medial portion 300, and a distal portion 400 aligned along the alignment axis 700, along which the applicator head 600, the multi-angle deflector 500, and the base 402 are aligned. The medial portion 300 includes only a single segment 305. The proximal portion 200 includes a handle 202 with a knob shape. It is to be appreciated that any version of the hair removal device 100 described herein may employ a similar configuration for the proximal portion 200, medial portion 300, and distal portion 400. Similarly, it is to be appreciated that the multi-angle deflector 500 comprising a plurality of circumferential leaf springs 503 may be employed in any configuration of the hair removal device 100 described herein. FIG. 57 provides a schematic perspective view of a multi-angle deflector 500 having a plurality of circumferential leaf springs 503.

Further Definitions and Cross-References

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" or +10% of the disclosed dimension.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A hair removal device comprising:
a hair removal surface, having a first perimeter,
a multi-angle deflector having a second perimeter that is greater than or equal to the first perimeter,
an applicator head having a third perimeter that is greater than or equal to the first perimeter,
a base having a fourth perimeter and coupled to the multi-angle deflector, wherein the third perimeter is greater than or equal to the fourth perimeter, and
wherein the multi-angle deflector is coupled to the hair removal surface, wherein the hair removal surface is coupled to the multi-angle deflector via the applicator head, wherein a base-deflector connection portion of the base is coupled to a deflector-base connection portion of the multi-angle deflector,
wherein an applicator-deflector connection portion of the applicator head is coupled to a deflector-applicator connection portion of the multi-angle deflector, and
wherein the multi-angle deflector is adapted to provide a multidirectional deflection connection of the applicator head relative to the base, and
wherein the fourth perimeter encircles the base-deflector connection portion of the base.

2. The hair removal device of claim 1, wherein the multi-angle deflector comprises a spring, a deformable substrate, or both.

3. The hair removal device of claim 2, wherein the deformable substrate comprises a sponge, an elastomeric web, or both.

4. The hair removal device of claim 3, wherein the deformable substrate has a deflection stiffness ranging from 0.05 N/mm and 5 N/mm.

5. The hair removal device of claim 1, wherein the multi-angle deflector comprises a wave spring.

6. The hair removal device of claim 1, wherein the multi-angle deflector comprises a thickness of 1 mm to 100 mm.

7. The hair removal device of claim 1, wherein the multi-angle deflector is adapted to provide a multidirectional deflection connection of the applicator head relative to the base.

8. The hair removal device of claim 7, wherein the multidirectional deflection connection of the applicator head relative to the base comprises a multidirectional pivoting movement in at least three dimensions.

9. The hair removal device of claim 1, wherein the multi-angle deflector has a thickness greater than a thickness of the base or a thickness of the applicator head.

10. The hair removal device of claim 1, wherein the multi-angle deflector comprises a central aperture.

11. The hair removal device of claim 1, wherein the multi-angle deflector comprises a central aperture, and wherein the base comprises a central aperture aligned with the central aperture of the multi-angle deflector.

12. The hair removal device of claim 1, wherein the multi-angle deflector comprises a plurality of rinsing windows through which debris and/or cut hairs can be removed.

13. The hair removal device of claim 1, wherein the hair removal surface provides removal of hair, oil, debris, or dead skin cells.

14. The hair removal device of claim 1, wherein the hair removal surface removes back hair.

15. The hair removal device of claim 1, wherein the applicator head supports and/or surrounds the hair removal surface.

16. The hair removal device of claim 1, wherein the hair removal surface comprises at least one treatment sheet.

17. The hair removal device of claim 16, wherein the treatment sheet comprises non-linear cutting edges.

\* \* \* \* \*